(12) United States Patent
McCabe et al.

(10) Patent No.: US 10,156,734 B2
(45) Date of Patent: Dec. 18, 2018

(54) EYEWEAR TRACTION DEVICES AND METHODS

(71) Applicant: Oakley, Inc., Foothill Ranch, CA (US)

(72) Inventors: Brock Scott McCabe, Laguna Niguel, CA (US); Benjamin John Meunier, San Clemente, CA (US); Ryan Saylor, Mission Viejo, CA (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

(21) Appl. No.: 15/372,814

(22) Filed: Dec. 8, 2016

(65) Prior Publication Data

US 2017/0160562 A1 Jun. 8, 2017

Related U.S. Application Data

(60) Provisional application No. 62/264,424, filed on Dec. 8, 2015.

(51) Int. Cl.
*G02C 3/00* (2006.01)
*G02C 5/14* (2006.01)
*G02C 5/12* (2006.01)

(52) U.S. Cl.
CPC ............ *G02C 3/003* (2013.01); *G02C 5/12* (2013.01); *G02C 5/143* (2013.01); *G02C 2200/20* (2013.01)

(58) Field of Classification Search
CPC .... G02C 3/003; G02C 2200/20; G02C 5/143; G02C 5/12
USPC ............................................ 351/123, 111, 41
See application file for complete search history.

(56) References Cited

U.S. PATENT DOCUMENTS

| 245,268 A | 8/1881 | Andross |
|---|---|---|
| 1,206,457 A | 11/1916 | Mills |
| 1,308,477 A | 7/1919 | Blanchard |
| 1,588,775 A | 6/1926 | Schumacher |
| 1,839,386 A | 1/1932 | Fischer |
| 1,910,456 A | 5/1933 | Baker |
| 1,918,954 A | 7/1933 | Baker |
| 1,942,393 A | 1/1934 | Baker |
| 1,943,910 A | 1/1934 | Baker |

(Continued)

FOREIGN PATENT DOCUMENTS

| CN | 201780416 | 3/2011 |
|---|---|---|
| DE | 102004058631 | 6/2006 |

(Continued)

OTHER PUBLICATIONS

International Search Report and Written Opinion in PCT/US2016/065631 dated Feb. 2, 2017, in 7 pages.

(Continued)

*Primary Examiner* — Tuyen Tra
(74) *Attorney, Agent, or Firm* — Sterne, Kessler, Goldstein & Fox P.L.L.C.

(57) ABSTRACT

Eyewear can be provided that include at least a support and a traction surface that allows the eyewear to be retained on a user's face. The support can include at least an earstem and a face. The traction surface can be coupled to a portion of the support. The traction surface can provide a greater amount of traction force before slipping when subject to forces in certain directions and can provide a lesser amount of traction force before slipping when subject to forces in other directions.

20 Claims, 10 Drawing Sheets

(56) References Cited

U.S. PATENT DOCUMENTS

| | | |
|---|---|---|
| 2,042,400 A | 5/1936 | Hon |
| 2,098,512 A | 11/1937 | Nerney |
| 2,391,361 A | 12/1945 | Stevenson |
| 2,443,422 A | 6/1948 | Hansen |
| 2,504,157 A | 4/1950 | Rosenheim |
| 2,652,746 A | 12/1950 | Shanks |
| 2,556,847 A | 6/1951 | MacLean |
| 2,610,323 A | 9/1952 | Johnson |
| 2,671,379 A | 3/1954 | Eloranta |
| 2,799,862 A | 7/1957 | Rowe |
| 2,571,704 A | 10/1961 | Gilden |
| 3,084,595 A | 4/1963 | Watts et al. |
| 3,214,767 A | 11/1965 | Weber |
| 3,229,303 A | 1/1966 | Jonassen |
| 3,233,250 A | 2/1966 | Jonassen |
| 3,383,707 A | 5/1968 | McNeill |
| 3,395,964 A | 8/1968 | Chartrice |
| 3,552,840 A | 1/1971 | Braget |
| 3,659,931 A | 5/1972 | Allen |
| 3,691,565 A | 9/1972 | Galonek |
| 3,826,564 A | 7/1974 | Werling, Sr. |
| 3,829,201 A | 8/1974 | Whiting |
| 3,901,589 A | 8/1975 | Bienenfeld |
| 3,931,646 A | 1/1976 | Loughner |
| 4,023,214 A | 5/1977 | Waldherr |
| 4,056,853 A | 11/1977 | Bottazzini et al. |
| 4,153,347 A | 5/1979 | Myer |
| 4,176,921 A | 12/1979 | Matthias |
| 4,178,080 A | 12/1979 | Elder |
| 4,264,987 A | 5/1981 | Runckel |
| 4,304,469 A | 12/1981 | Solomon |
| 4,314,814 A | 2/1982 | Deroode |
| 4,331,393 A | 5/1982 | Bradly, Jr. |
| 4,340,282 A | 7/1982 | Murakami |
| 4,357,080 A | 11/1982 | Solomon |
| 4,471,496 A | 9/1984 | Gardner, Jr. et al. |
| 4,515,448 A | 5/1985 | Tackles |
| 4,527,291 A | 7/1985 | Nussbickl |
| 4,616,367 A | 10/1986 | Jean et al. |
| 4,632,526 A | 12/1986 | Lhospice |
| 4,662,729 A * | 5/1987 | Dobson .................. G02C 3/003 351/122 |
| 4,662,966 A | 5/1987 | Sumi et al. |
| 4,670,084 A | 6/1987 | Durand |
| 4,674,851 A | 6/1987 | Jannard |
| 4,686,712 A | 8/1987 | Spiva |
| 4,715,702 A | 12/1987 | Dillon |
| 4,730,915 A | 3/1988 | Jannard |
| 4,747,681 A | 5/1988 | Brower |
| 4,759,622 A | 7/1988 | Schmidthaler |
| 4,813,775 A | 3/1989 | Kaksonen |
| 4,822,158 A | 4/1989 | Porsche |
| 4,843,655 A | 7/1989 | Hegendorfer |
| 4,859,048 A | 8/1989 | Jannard |
| 4,867,550 A | 9/1989 | Jannard |
| 4,878,749 A | 11/1989 | McGee |
| 4,901,374 A | 2/1990 | Van der Woude |
| 4,951,322 A | 8/1990 | Lin |
| 4,978,209 A | 12/1990 | Ohba |
| 4,983,030 A | 1/1991 | Chandler |
| 5,007,727 A | 4/1991 | Kahaney et al. |
| 5,016,293 A | 5/1991 | Lickle |
| 5,048,944 A | 9/1991 | Porsche |
| 5,056,163 A | 10/1991 | Chou |
| 5,069,541 A | 12/1991 | Holmes et al. |
| 5,144,344 A | 9/1992 | Takahashi et al. |
| 5,170,502 A | 12/1992 | Hegendorfer et al. |
| 5,182,586 A | 1/1993 | Bennato |
| 5,182,587 A | 1/1993 | Hyoi |
| 5,191,364 A | 3/1993 | Kopfer |
| 5,208,614 A | 5/1993 | Jannard |
| 5,257,050 A | 10/1993 | Wiedner |
| 5,270,743 A | 12/1993 | Hofmair et al. |
| 5,291,230 A | 3/1994 | Bradley |
| 5,308,426 A | 5/1994 | Claveau |
| 5,357,292 A | 10/1994 | Wiedner |
| 5,359,370 A | 10/1994 | Mugnier |
| 5,373,331 A | 12/1994 | Vallalla et al. |
| 5,379,463 A | 1/1995 | Schleger et al. |
| 5,387,949 A | 2/1995 | Tackles |
| 5,390,369 A | 2/1995 | Tubin |
| 5,400,089 A | 3/1995 | Danloup et al. |
| 5,410,763 A | 5/1995 | Bolle |
| 5,412,438 A | 5/1995 | Bolle |
| 5,418,580 A | 5/1995 | Sondrol |
| 5,418,581 A | 5/1995 | Conway |
| 5,423,092 A | 6/1995 | Kawai |
| 5,428,407 A | 6/1995 | Sheffield |
| 5,455,639 A | 10/1995 | Magdelaine et al. |
| 5,467,148 A | 11/1995 | Conway |
| 5,493,348 A | 2/1996 | Harald, Jr. et al. |
| 5,536,828 A | 7/1996 | Deluca et al. |
| 5,541,674 A | 7/1996 | Jannard |
| 5,550,599 A | 8/1996 | Jannard |
| 5,576,775 A | 11/1996 | Bolle |
| 5,583,583 A | 12/1996 | Wilson |
| 5,587,747 A | 12/1996 | Bernheiser |
| 5,602,603 A | 2/1997 | Bondet |
| 5,608,470 A | 3/1997 | Sheffield |
| 5,610,668 A | 3/1997 | Mage |
| 5,617,588 A | 4/1997 | Canavan et al. |
| 5,619,287 A | 4/1997 | Tseng |
| 5,638,145 A | 6/1997 | Jannard et al. |
| 5,641,372 A | 6/1997 | Okuno |
| 5,648,832 A | 7/1997 | Houston et al. |
| 5,652,954 A | 8/1997 | Paiement et al. |
| 5,657,106 A | 8/1997 | Herald et al. |
| 5,685,022 A | 11/1997 | Essman et al. |
| 5,689,323 A | 11/1997 | Houston et al. |
| 5,708,489 A | 1/1998 | Jannard |
| 5,727,251 A | 3/1998 | Sherlock et al. |
| 5,752,280 A | 5/1998 | Hill |
| 5,760,866 A | 6/1998 | Wedeck et al. |
| 5,765,223 A | 6/1998 | McCausland |
| 5,768,716 A | 6/1998 | Porsche |
| 5,790,230 A | 8/1998 | Sved |
| 5,793,463 A | 8/1998 | Hirschman et al. |
| 5,796,461 A | 8/1998 | Stepan |
| 5,798,017 A | 8/1998 | Claveau |
| 5,802,622 A | 9/1998 | Baharad et al. |
| 5,805,261 A | 9/1998 | Houston et al. |
| 5,809,580 A | 9/1998 | Arnette |
| 5,815,235 A | 9/1998 | Runckel |
| 5,841,506 A | 11/1998 | Karasawa et al. |
| 5,862,529 A | 1/1999 | Moodie |
| 5,898,468 A | 4/1999 | Mage |
| 5,898,469 A | 4/1999 | Wang |
| 5,903,331 A | 5/1999 | Lin |
| 5,914,767 A | 6/1999 | Wedeck et al. |
| 5,929,963 A | 7/1999 | McNeal |
| 5,956,116 A | 9/1999 | Ishiyama |
| 5,963,293 A | 10/1999 | Jannard |
| 5,969,789 A | 10/1999 | Houston et al. |
| 5,971,536 A | 10/1999 | Chiu |
| 5,971,538 A | 10/1999 | Heffner |
| 5,987,702 A | 11/1999 | Simioni |
| 6,007,199 A | 12/1999 | Yang |
| 6,009,564 A | 1/2000 | Tackles et al. |
| 6,010,217 A | 1/2000 | Houston et al. |
| 6,010,218 A | 1/2000 | Houston et al. |
| 6,047,410 A | 4/2000 | Dondero |
| 6,056,399 A | 5/2000 | Jannard et al. |
| 6,062,688 A | 5/2000 | Vinas |
| D428,620 S | 7/2000 | Maturaporn |
| 6,086,199 A | 7/2000 | Holland et al. |
| 6,094,751 A | 8/2000 | Parks |
| 6,098,204 A | 8/2000 | Arnette |
| 6,102,033 A | 8/2000 | Baribeau |
| 6,105,177 A | 8/2000 | Paulson et al. |
| 6,106,116 A | 8/2000 | Houston et al. |
| 6,119,279 A | 9/2000 | Haslbeck |
| 6,131,246 A | 10/2000 | Paulson et al. |
| 6,168,271 B1 | 1/2001 | Houston et al. |
| 6,193,367 B1 | 2/2001 | Lee |

(56) References Cited

U.S. PATENT DOCUMENTS

| | | |
|---|---|---|
| 6,206,519 B1 | 3/2001 | Lin |
| 6,233,342 B1 | 3/2001 | Fernandez |
| 6,224,209 B1 | 5/2001 | Chen |
| 6,231,179 B1 | 5/2001 | Lee |
| 6,231,181 B1 | 5/2001 | Swab |
| 6,244,705 B1 | 6/2001 | Ledbetter et al. |
| 6,250,756 B1 | 6/2001 | Jannard |
| 6,260,964 B1 | 7/2001 | Kroman |
| 6,273,564 B1 | 8/2001 | Wedeck et al. |
| 6,276,794 B1 | 8/2001 | Chiang |
| 6,282,727 B1 | 9/2001 | Lindahl |
| 6,290,354 B1 | 9/2001 | Safran |
| 6,296,357 B1 | 10/2001 | Bof |
| D452,522 S | 12/2001 | Chiou |
| 6,349,422 B1 | 2/2002 | Schleger et al. |
| 6,357,873 B1 | 3/2002 | Spindelbalker |
| 6,375,321 B1 | 4/2002 | Lee et al. |
| 6,386,703 B1 | 5/2002 | Huang |
| 6,386,704 B1 | 5/2002 | Wu |
| 6,428,165 B1 | 8/2002 | Rivera |
| 6,464,353 B1 | 10/2002 | Spindelbalker |
| 6,474,812 B1 | 11/2002 | Moon |
| 6,477,717 B1 | 11/2002 | Winefordner et al. |
| 6,502,937 B2 | 1/2003 | Yang |
| 6,533,412 B1 | 3/2003 | Wang et al. |
| 6,540,351 B1 | 4/2003 | Meiler |
| 6,543,895 B2 | 4/2003 | Fukai |
| 6,550,912 B2 | 4/2003 | Vitaloni |
| 6,550,914 B1 | 4/2003 | Kopfer |
| 6,561,647 B1 | 5/2003 | Chen |
| 6,564,804 B2 | 5/2003 | Salatka et al. |
| 6,575,570 B2 | 6/2003 | Mauri |
| 6,637,877 B1 | 10/2003 | Hartley et al. |
| 6,641,263 B2 | 11/2003 | Olney |
| D485,570 S | 1/2004 | Teng |
| 6,702,439 B1 | 3/2004 | Lee |
| 6,712,465 B1 | 3/2004 | Teng |
| 6,715,157 B2 | 4/2004 | Mage |
| 6,718,561 B2 | 4/2004 | Dondero |
| 6,732,383 B2 | 5/2004 | Cleary et al. |
| 6,742,890 B1 | 6/2004 | Teng |
| 6,742,891 B2 | 6/2004 | Chen |
| 6,749,299 B1 | 6/2004 | Hsu |
| 6,783,235 B1 | 8/2004 | Lin |
| 6,786,592 B2 | 9/2004 | Rivera |
| 6,793,336 B2 | 9/2004 | Min |
| 6,804,835 B2 | 10/2004 | Chou |
| 6,817,709 B2 | 11/2004 | Min |
| 6,834,951 B2 | 12/2004 | Xie |
| 6,854,845 B2 | 2/2005 | Goldman et al. |
| 6,857,738 B1 | 2/2005 | Bove et al. |
| 6,863,394 B1 | 3/2005 | Nelson et al. |
| 6,863,395 B1 | 3/2005 | Teng |
| 6,877,169 B2 | 4/2005 | Acquaviva |
| 6,908,193 B2 | 6/2005 | Cyr |
| D508,255 S | 8/2005 | Wu |
| 6,923,537 B2 | 8/2005 | Hartley et al. |
| 6,926,403 B2 | 8/2005 | Yi et al. |
| 6,926,404 B2 | 8/2005 | Bassahon et al. |
| 6,928,663 B1 | 8/2005 | Tappeiner |
| 6,929,364 B1 | 8/2005 | Jannard |
| 6,938,277 B2 | 9/2005 | Lindahl |
| 6,942,338 B2 | 9/2005 | Ku |
| 6,948,813 B2 | 9/2005 | Parks |
| 6,953,247 B1 | 10/2005 | Duffy et al. |
| D511,540 S | 11/2005 | Hsu |
| 6,959,988 B1 | 11/2005 | Sheldon |
| 6,964,067 B1 | 11/2005 | Hartman |
| 6,964,477 B1 | 11/2005 | Teng |
| 6,969,170 B1 | 11/2005 | Smith |
| 6,969,171 B2 | 11/2005 | Lane et al. |
| D513,033 S | 12/2005 | Hsu |
| 6,994,434 B2 | 2/2006 | Blanchette et al. |
| 7,000,263 B2 | 2/2006 | McNeal |
| 7,003,802 B2 | 2/2006 | Broersma |
| 7,029,114 B2 | 4/2006 | Smith |
| 7,036,152 B2 | 5/2006 | Gafforio et al. |
| 7,036,927 B2 | 5/2006 | Kopfer |
| 7,039,959 B2 | 5/2006 | Dondero |
| 7,058,991 B2 | 6/2006 | Hartman |
| 7,083,276 B2 | 8/2006 | Olney |
| 7,090,346 B2 | 8/2006 | Tsai |
| 7,091,634 B2 | 8/2006 | Yi et al. |
| 7,100,215 B2 | 9/2006 | Shiue |
| 7,137,426 B2 | 11/2006 | Neri et al. |
| 7,137,700 B2 | 11/2006 | DiChiara et al. |
| 7,150,525 B1 | 12/2006 | Yang |
| 7,163,289 B2 | 1/2007 | Wedeck et al. |
| D537,097 S | 2/2007 | Freeman |
| D537,860 S | 3/2007 | Freeman |
| 7,192,134 B2 | 3/2007 | Teng |
| 7,200,875 B2 | 4/2007 | Dondero |
| 7,204,589 B2 | 4/2007 | Pieterman |
| 7,219,992 B1 | 5/2007 | Wu |
| 7,219,993 B1 | 5/2007 | Chiou |
| 7,222,958 B1 | 5/2007 | Chiou |
| 7,222,959 B2 | 5/2007 | Jannard |
| 7,234,808 B2 | 6/2007 | Bruck |
| 7,237,891 B2 | 7/2007 | Min |
| 7,241,007 B2 | 7/2007 | Cody |
| 7,244,022 B2 | 7/2007 | Lee |
| 7,261,410 B1 | 8/2007 | Chen |
| 7,267,434 B2 | 9/2007 | Lane et al. |
| 7,267,737 B2 | 9/2007 | Neri et al. |
| 7,278,733 B2 | 10/2007 | Olney |
| 7,296,887 B1 | 11/2007 | Hsiung |
| 7,328,999 B2 | 2/2008 | Zelman |
| 7,343,631 B2 | 3/2008 | Lin |
| 7,347,545 B1 | 3/2008 | Jannard et al. |
| 7,364,287 B2 | 4/2008 | Lee et al. |
| 7,370,961 B2 | 5/2008 | Lerner et al. |
| 7,384,141 B2 | 6/2008 | Zelman |
| 7,390,086 B2 | 6/2008 | Lee |
| 7,396,124 B1 | 7/2008 | Wang |
| 7,407,281 B2 | 8/2008 | Tagawa |
| 7,425,065 B2 | 9/2008 | Wang |
| 7,431,453 B2 | 10/2008 | Hogan |
| 7,434,929 B2 | 10/2008 | Jackson |
| 7,441,889 B2 | 10/2008 | Zelman |
| 7,452,068 B2 | 11/2008 | Collier et al. |
| 7,452,069 B2 | 11/2008 | Lipawsky |
| 7,478,906 B2 | 1/2009 | Fielding |
| 7,481,529 B1 | 1/2009 | Chen |
| 7,497,569 B2 | 3/2009 | Webb |
| 7,520,217 B2 | 4/2009 | Roberts et al. |
| 7,520,604 B2 | 4/2009 | Choi |
| 7,520,605 B1 | 4/2009 | Chen |
| 7,526,813 B2 | 5/2009 | Tominaga et al. |
| 7,553,013 B2 | 6/2009 | Tsai |
| 7,556,373 B2 | 7/2009 | VanAtta et al. |
| 7,563,341 B2 | 7/2009 | Ferguson et al. |
| 7,585,072 B1 | 9/2009 | Wang-Lee |
| 7,585,073 B2 | 9/2009 | Paolino |
| 7,594,280 B2 | 9/2009 | Lindahl |
| 7,594,723 B2 | 9/2009 | Jannard et al. |
| 7,604,346 B2 | 10/2009 | Wang |
| 7,648,233 B2 | 1/2010 | Blanshay et al. |
| 7,658,492 B2 | 2/2010 | Siu |
| 7,681,257 B1 | 3/2010 | Broersma |
| 7,686,449 B2 | 3/2010 | Jannard et al. |
| 7,703,913 B2 | 4/2010 | Huang |
| D615,580 S | 5/2010 | Baden et al. |
| D616,485 S | 5/2010 | Thixton |
| 7,712,894 B2 | 5/2010 | Tsai |
| 7,712,896 B1 | 5/2010 | Lee |
| 7,725,959 B2 | 6/2010 | Wang-Lee |
| D622,303 S | 8/2010 | Thixton |
| D622,304 S | 8/2010 | Baden et al. |
| 7,771,043 B2 | 8/2010 | Welchel et al. |
| 7,780,810 B2 | 8/2010 | Hamano |
| 7,810,174 B2 | 10/2010 | Matera |
| D629,035 S | 12/2010 | Moritz |
| 7,850,301 B2 | 12/2010 | DiChiara |
| 7,856,673 B2 | 12/2010 | Reed |

(56) References Cited

U.S. PATENT DOCUMENTS

| | | |
|---|---|---|
| 7,887,181 B1 | 2/2011 | Chen |
| 7,908,668 B2 | 3/2011 | Folkesson |
| D639,845 S | 6/2011 | Fuchs |
| D640,725 S | 6/2011 | Moritz et al. |
| D640,727 S | 6/2011 | Moritz et al. |
| 7,954,942 B2 | 6/2011 | Calilung et al. |
| D646,708 S | 10/2011 | Baden et al. |
| 8,028,350 B2 | 10/2011 | Hogen |
| D649,178 S | 11/2011 | Moritz |
| D653,697 S | 2/2012 | Taylor |
| D653,698 S | 2/2012 | Taylor |
| D659,180 S | 5/2012 | Moritz |
| 8,192,015 B2 | 6/2012 | Taylor et al. |
| 8,235,523 B2 | 8/2012 | Yang |
| 8,303,109 B2 | 11/2012 | Matera |
| 8,307,466 B2 | 11/2012 | Hsu |
| 8,316,470 B2 | 11/2012 | McNeal et al. |
| D675,666 S | 2/2013 | Thixton et al. |
| 8,408,695 B2 | 4/2013 | Calilung et al. |
| 8,414,119 B2 | 4/2013 | Yeh |
| 8,424,474 B2 | 4/2013 | Berns |
| 8,469,510 B2 | 6/2013 | Belbey et al. |
| 8,534,830 B2 | 9/2013 | Taylor et al. |
| 8,661,562 B2 | 3/2014 | Calilung et al. |
| 8,668,330 B2 | 3/2014 | Reyes et al. |
| 8,746,877 B2 | 6/2014 | Belbey et al. |
| 8,800,067 B2 | 8/2014 | Saylor et al. |
| 8,850,626 B2 | 10/2014 | Reyes et al. |
| 8,881,316 B2 | 11/2014 | Reyes et al. |
| 8,911,076 B2 | 12/2014 | Calilung et al. |
| 9,122,078 B2 | 9/2015 | Calilung et al. |
| 9,188,792 B2 | 11/2015 | Calilung et al. |
| 9,192,520 B2 | 11/2015 | Cater et al. |
| 9,241,833 B2 | 1/2016 | Cater et al. |
| 9,463,117 B2 | 10/2016 | Belbey et al. |
| 9,709,817 B2 | 7/2017 | Calilung et al. |
| 9,717,631 B2 | 8/2017 | Cater et al. |
| 2002/0039928 A1 | 4/2002 | Spurgeon et al. |
| 2003/0048405 A1 | 3/2003 | Rivera |
| 2003/0067584 A1 | 4/2003 | Siu |
| 2003/0188376 A1 | 10/2003 | Dondero |
| 2004/0025232 A1 | 2/2004 | Hartley et al. |
| 2004/0083540 A1 | 5/2004 | Dondero |
| 2004/0139532 A1 | 7/2004 | Parks |
| 2004/0141146 A1 | 7/2004 | Blanchette et al. |
| 2004/0141147 A1 | 7/2004 | Cyr |
| 2004/0160570 A1 | 8/2004 | Polovin |
| 2005/0070434 A1 | 3/2005 | Drake |
| 2005/0105041 A1 | 5/2005 | Lerner et al. |
| 2005/0132478 A1 | 6/2005 | Canavan |
| 2005/0160521 A1 | 7/2005 | Hussey |
| 2005/0268385 A1 | 12/2005 | Hartman et al. |
| 2005/0270477 A1 | 12/2005 | Curci et al. |
| 2005/0286013 A1 | 12/2005 | Aylor |
| 2006/0048289 A1 | 3/2006 | Shiue |
| 2006/0119790 A1 | 6/2006 | Tsai |
| 2006/0179554 A1 | 8/2006 | Barton |
| 2006/0191062 A1 | 8/2006 | Matera |
| 2006/0238700 A1 | 10/2006 | Del Vecchio |
| 2006/0250571 A1 | 11/2006 | Li |
| 2006/0256281 A1 | 11/2006 | Li |
| 2006/0283555 A1 | 12/2006 | Green |
| 2007/0006425 A1 | 1/2007 | Woodbury |
| 2007/0024806 A1 | 2/2007 | Blanshay |
| 2007/0033718 A1 | 2/2007 | Lin |
| 2007/0091253 A1 | 4/2007 | Chao |
| 2007/0109490 A1 | 5/2007 | Collier et al. |
| 2007/0121059 A1 | 5/2007 | Chiou |
| 2007/0153230 A1 | 7/2007 | Musal et al. |
| 2007/0182916 A1 | 8/2007 | Blanshay et al. |
| 2007/0240812 A1 | 10/2007 | Bortolato |
| 2007/0261782 A1 | 11/2007 | Frye et al. |
| 2008/0036961 A1 | 2/2008 | Zhou |
| 2008/0072365 A1 | 3/2008 | Alberto |
| 2008/0094567 A1 | 4/2008 | Choi |
| 2008/0137028 A1 | 6/2008 | Webb |
| 2008/0155736 A1 | 7/2008 | Paulson et al. |
| 2008/0198323 A1 | 8/2008 | Sui Yu |
| 2008/0266515 A1 | 10/2008 | Hou |
| 2008/0301858 A1 | 12/2008 | Wang-Lee |
| 2008/0304005 A1 | 12/2008 | DiChiara |
| 2009/0007388 A1 | 1/2009 | Villeneuva |
| 2009/0015784 A1 | 1/2009 | Van Atta |
| 2009/0019620 A1 | 1/2009 | Reed |
| 2009/0038057 A1 | 2/2009 | Tews |
| 2009/0038059 A1 | 2/2009 | McNeal et al. |
| 2009/0044317 A1 | 2/2009 | Tews |
| 2009/0066906 A1 | 3/2009 | Huang |
| 2009/0079931 A1 | 3/2009 | Yang |
| 2009/0122254 A1 | 5/2009 | Van Der Heijde et al. |
| 2009/0151037 A1 | 6/2009 | Hsu |
| 2009/0217444 A1 | 9/2009 | Pan |
| 2009/0225271 A1 | 9/2009 | Radmard et al. |
| 2009/0300830 A1 | 12/2009 | Mage |
| 2009/0313746 A1 | 12/2009 | Wang |
| 2009/0323015 A1 | 12/2009 | Siu |
| 2010/0186153 A1 | 7/2010 | Reyes et al. |
| 2010/0201937 A1 | 8/2010 | Gardaz |
| 2010/0231850 A1 | 9/2010 | Hones |
| 2011/0170049 A1 | 7/2011 | Chen |
| 2011/0194065 A1 | 8/2011 | Belbey et al. |
| 2011/0242479 A1 | 10/2011 | Radmard et al. |
| 2011/0258758 A1 | 10/2011 | Renaud |
| 2011/0279771 A1 | 11/2011 | Chen |
| 2012/0127421 A1 | 5/2012 | Li |
| 2012/0255104 A1 | 10/2012 | Didier |
| 2012/0257159 A1 | 10/2012 | Silver |
| 2013/0019374 A1 | 1/2013 | Schwartz |
| 2013/0083285 A1 | 4/2013 | McNeal et al. |
| 2013/0104300 A1 | 5/2013 | Park |
| 2014/0059747 A1 | 3/2014 | Belbey et al. |
| 2014/0063437 A1 | 3/2014 | Cater et al. |
| 2014/0063438 A1 | 3/2014 | Cater et al. |
| 2014/0078460 A1 | 3/2014 | Chang et al. |
| 2016/0216533 A1 | 7/2016 | Calilung et al. |
| 2017/0095371 A1 | 4/2017 | Cater et al. |
| 2017/0100287 A1 | 4/2017 | Calilung et al. |
| 2017/0160563 A1 | 6/2017 | Calilung et al. |

FOREIGN PATENT DOCUMENTS

| | | |
|---|---|---|
| EP | 0 496 292 | 1/1991 |
| EP | 0 495 767 | 7/1992 |
| EP | 0 702 803 | 3/1996 |
| EP | 1382989 | 1/2004 |
| EP | 1428061 | 6/2004 |
| EP | 1 810 648 | 7/2007 |
| EP | 1 830 221 | 9/2007 |
| EP | 2 042 910 | 4/2009 |
| EP | 2 090 921 | 8/2009 |
| FR | 1 126 329 | 11/1956 |
| FR | 1290346 A | 4/1962 |
| FR | 2 088 866 | 1/1972 |
| FR | 2 626 682 | 8/1989 |
| FR | 2 684 292 | 6/1993 |
| FR | 2 800 173 | 4/2001 |
| GB | 468443 | 7/1937 |
| GB | 512419 | 9/1939 |
| GB | 2055222 | 2/1981 |
| GB | 2181859 | 4/1987 |
| GB | 2199155 | 6/1988 |
| GB | 2278459 | 11/1994 |
| JP | 62-3774 Y2 | 7/1926 |
| JP | 56-126611 | 2/1955 |
| JP | 56-066915 | 6/1981 |
| JP | 57-176119 | 11/1982 |
| JP | 59-79827 | 5/1984 |
| JP | 59-104127 | 6/1984 |
| JP | 60-094624 | 6/1985 |
| JP | 60-146218 | 8/1985 |
| JP | 60-143420 | 9/1985 |
| JP | 61-160422 | 10/1986 |
| JP | 219021 | 2/1990 |
| JP | 02-240360 | 9/1990 |

(56) References Cited

FOREIGN PATENT DOCUMENTS

| JP | 07-032628 | 2/1995 |
|---|---|---|
| JP | 07-64028 | 3/1995 |
| JP | 07-140423 | 6/1995 |
| JP | 7-234385 | 9/1995 |
| JP | 3021121 U | 2/1996 |
| JP | 08-062544 | 3/1996 |
| JP | 10-239642 | 9/1998 |
| JP | 2002-228986 | 8/2002 |
| JP | 2003-536093 | 12/2003 |
| JP | 2005-067551 | 3/2005 |
| JP | 2009-139921 | 6/2009 |
| JP | 2010-224130 | 10/2010 |
| JP | 2012-509497 | 4/2012 |
| KR | 10-2014-0027745 | 3/2014 |
| WO | WO 94/29763 | 12/1994 |
| WO | WO 97/21135 | 6/1997 |
| WO | WO 97/41815 | 11/1997 |
| WO | WO 99/64918 | 12/1999 |
| WO | WO 03/023495 | 3/2003 |
| WO | WO 2005/119343 | 12/2005 |
| WO | WO 2007/049070 | 5/2007 |
| WO | WO 2008/125743 | 10/2008 |
| WO | WO 2010/021419 | 2/2010 |
| WO | WO 2011/117909 | 9/2011 |
| WO | WO 2013/154582 | 10/2013 |
| WO | WO 2014/124352 | 8/2014 |
| WO | WO 2015/148770 | 10/2015 |

OTHER PUBLICATIONS

Oakley Wind Jacket, released at least as early as Aug. 30, 2011.
PIVLOCK V2—Smith Optics Elite, dated Nov. 7, 2013, available at: https://www.youtube.com/watch?v=WIVQVmO1x0g.

\* cited by examiner

EYEWEAR TRACTION DEVICES AND METHODS

RELATED APPLICATIONS

This application claims priority to U.S. Provisional Application No. 62/264,424, filed on Dec. 8, 2015. The entire contents of the application identified above is incorporated by reference herein and made a part of this specification.

BACKGROUND

Field

The embodiments described herein relate generally to traction devices and methods for eyewear. In particular, some embodiments described herein relate to eyewear having traction devices which can assist in maintaining an eyewear on a head of a wearer in a particular position or orientation.

Background

There are numerous situations in which it is convenient and preferable to include a traction device on an eyewear to allow a user to more securely retain the eyewear on the user's head. In some situations, such as those involving active sports, it can be particularly advantageous to maintain an eyewear in place on the wearer's head in a particular position or orientation during periods of forceful movement.

SUMMARY

Accordingly, there is a need for traction devices and methods for eyewear. In some embodiments, the eyewear can include a support which can be carried on a head of a user and can support a lens in the field of view of a user. The support can include an earstem having an exterior surface which can be positioned proximate a lateral side of a user's head and a user's ear. The support can include a nosepiece having an exterior surface which can be positioned proximate a user's nose. The eyewear can include a traction surface on at least one of the earstem and the nosepiece. The traction surface can include a plurality of protrusions. The plurality of protrusions can extend obliquely from the exterior surface on which the traction surface is located.

In some embodiments, the plurality of protrusions extending obliquely from the exterior surface can be more parallel with the exterior surface than perpendicular. In some embodiments, the plurality of protrusions extending obliquely from the exterior surface can be more perpendicular to the exterior surface than parallel. In some embodiments, the plurality of protrusions extending obliquely from the exterior surface can be generally equally perpendicular to the exterior surface as parallel.

In some embodiments, the traction surface can exert a traction force on a contact surface at a plurality of contact points within the contact surface, the traction force being configured to inhibit slipping of the eyewear on a user's head when worn. In some embodiments, at a contact point within the contact surface, the traction surface, when subject to a force in a first direction within a plane tangent to the contact surface at the contact point, can exert up to a first amount of traction force before slipping. In some embodiments, at a contact point within the contact surface, the traction surface, when subject to a force in a second direction within a plane tangent to the contact surface at the contact point, can exert up to a second amount of traction force before slipping. In some embodiments, the first amount of traction force can be greater than the second amount of traction force. In some embodiments, the plurality of protrusions extending obliquely from the exterior surface can extend in a direction with a component generally opposite the first direction.

In some embodiments, the traction surface can be on at least the nosepiece and the contact surface is at least a portion of the user's nose. In some embodiments, at one or more contact points within the contact surface, the first direction can extend generally downwardly and anteriorly relative to the user's nose and can form an acute angle with a first axis, the first axis being within a plane tangent to the contact surface at the one or more contact points and parallel to a horizontal axis. In some embodiments, the one or more contact points can include a majority of contact points within the contact surface.

In some embodiments, the traction surface can be on at least the earstem and the contact surface is at least a portion of the user's ear. In some embodiments, at one or more contact points within the contact surface, the first direction can extend generally anteriorly relative to a user's ear. In some embodiments, the one or more contact points can include a majority of contact points within the contact surface.

In some embodiments, the traction surface can include a first portion and a second portion. In some embodiments, at a contact point within a first portion of a contact surface, the first portion of the traction surface, when subject to a force in a first direction within a plane tangent to the first portion of the contact surface at the contact point, can exert up to a first amount of traction force before slipping and, when subject to a force in a second direction within a plane tangent to the first portion of the contact surface at the contact point, can exert up to a second amount of traction force before slipping, wherein the first amount of traction force is greater than the second amount of traction force. In some embodiments, at a contact point within a second portion of the contact surface, the second portion of the traction surface, when subject to a force in a third direction within a plane tangent to the second portion of the contact surface at the contact point, can exert up to a third amount of traction force before slipping and, when subject to a force in a fourth direction within a plane tangent to the second portion of the contact surface at the contact point, can exert up to a fourth amount of traction force before slipping, wherein the third amount of traction force is greater than the fourth amount of traction force. In some embodiments, the first direction can be different from the third direction.

In some embodiments, the traction surface can be integrally formed on the support. In some embodiments, the traction surface can be formed from the same material as the material of the portions of the support adjacent the traction surface. In some embodiments, the traction surface can be formed on a traction member, wherein the traction member can be attached to the support. In some embodiments, the traction member can be removably attached to the support. In some embodiments, the traction member can not be removably attached to the support.

In some embodiments, the eyewear can include a support which can be carried on a head of a user and can support a lens in the field of view of a user. The support can include an earstem having an exterior surface which can be positioned proximate a lateral side of a user's head and a user's ear. The support can include a nosepiece having an exterior surface configured to be positioned proximate a user's nose. The support can include a traction surface on at least one of the earstem and the nosepiece. The traction surface can exert a traction force on a contact surface at a plurality of contact points within the contact surface, the traction force being configured to inhibit slipping of the eyewear on a user's head when worn. The traction surface, when subject to a force in a first direction within a plane tangent to the contact surface at the contact point, can exert up to a first amount of traction force before slipping. The traction surface, when subject to a force in a second direction within a plane tangent to the contact surface at the contact point, can exert up to a second amount of traction force before slipping. The first amount of traction force is greater than the second amount of traction force.

In some embodiments, the traction surface can be on at least the nosepiece and the contact surface is at least a portion of the user's nose. In some embodiments, at one or more contact points within the contact surface, the first direction extends generally downwardly and anteriorly relative to the user's nose and forms an acute angle with a first axis, the first axis being within a plane tangent to the contact surface at the one or more contact points and parallel to a horizontal axis.

In some embodiments, the traction surface can be on at least the earstem and the contact surface is at least a portion of the user's ear. In some embodiments, at one or more contact points within the contact surface, the first direction extends generally anteriorly relative to a user's ear.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples of embodiments in accordance with the disclosure, and are not to be considered limiting of its scope, the disclosure will be described with additional specificity and detail through the use of the accompanying drawings.

DETAILED DESCRIPTION

Figure 1:
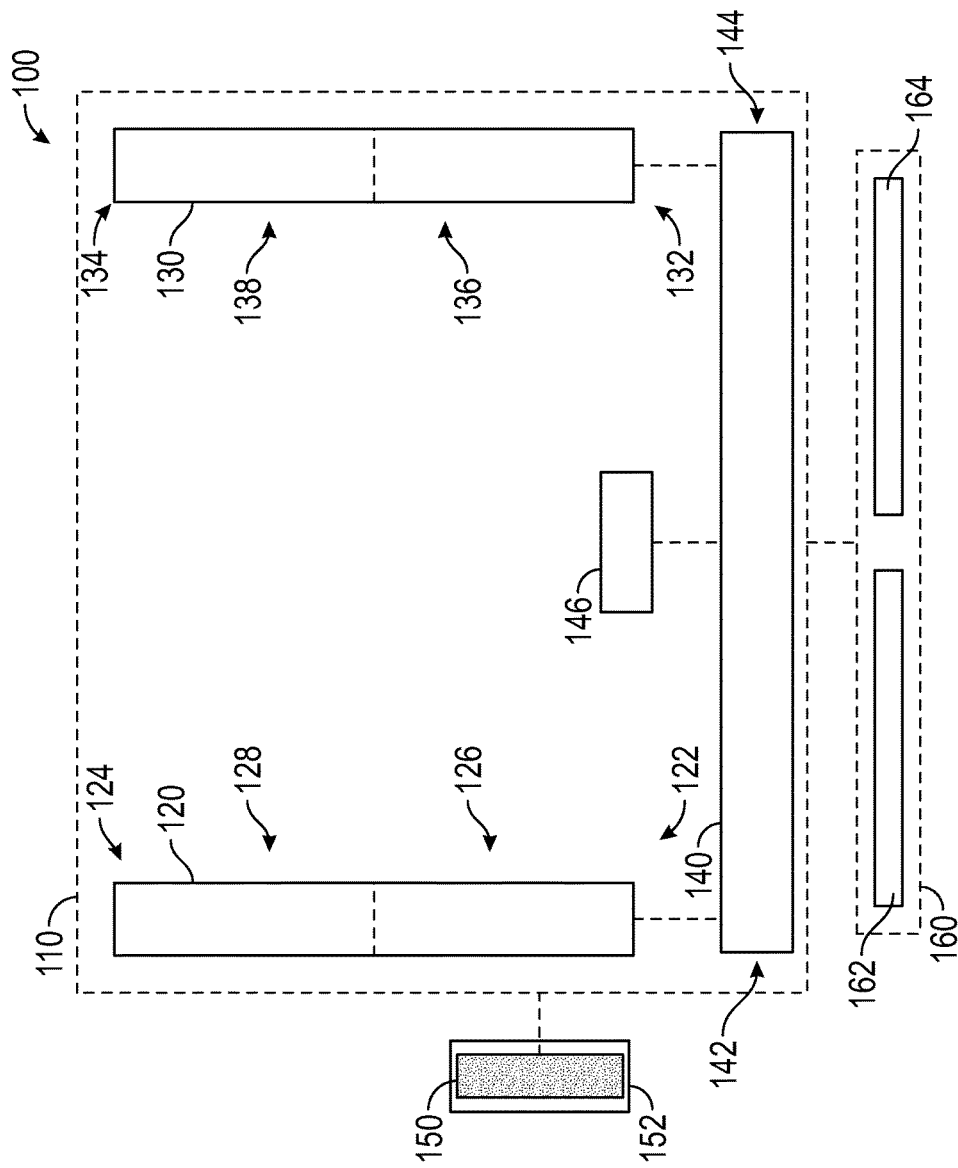
FIG. 1 illustrates a schematic of an embodiment of an eyewear having a traction surface on a traction member.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the proceeding technical field, background, brief summary, or the following detailed description.

The present specification and drawings provide aspects and features of eyewear retention devices and methods, in the context of several embodiments of devices and methods. As used in the present specification and drawings, "eyewear" and "eyeglasses" are general terms intended to be used in accordance with their ordinary meanings. For example, these terms embrace any optical devices, such as those containing corrective lenses for defects in vision or lenses for such special purposes as filters for absorbing or blocking portions of the electromagnetic spectrum, providing physical shields for the eyes or making available other physical or optical functions for protective or visual assisting purposes. These embodiments are described and illustrated in connection with specific types of eyewear such as eyewear having dual lenses. However, it is to be understood that the features and concepts discussed herein, such as the traction surfaces, can be applied to other types of wearable devices including, but not limited to, eyewear having a single lens or no lens, goggles with or without lenses, helmets, outerwear such as apparel, jewelry such as earrings, bracelets and necklaces, watches, personal electronic devices such as a communication device, and the like. Moreover, it is also to be understood that although particular embodiments may be disclosed or shown in the context of frames having full orbitals, such embodiments can be used with frames having full or partial orbitals or rimless or faceless frames. In addition, particular features of the devices, systems, and methods should not be taken as limiting, and features of any one embodiment discussed herein can be combined with features of other embodiments as desired and when appropriate. Any feature, step, material, or structure described and/or illustrated in any embodiment can be used with or instead of any other feature, step, material, or structure described and/or illustrated in any other embodiment. Anything in this specification can be omitted in some embodiments; no features described or illustrated in this specification are essential or indispensable.

Certain terminology may be used in the following description for the purpose of reference only, and thus are not intended to be limiting. For example, terms such as "upper", "lower", "inner", "outer", "above", and "below" refer to directions in the drawings to which reference is made. Terms such as "anterior", "posterior", "right", "left", "right side", "left side" describe the orientation and/or location of portions of the component within a consistent but arbitrary support of reference which is made clear by reference to the text and the associated drawings describing the component under discussion. Such terminology may include the words specifically mentioned above, derivatives thereof, and words of similar import. Similarly, the terms "first", "second", "third", and other such numerical terms referring to structures do not imply a sequence or order, or a requirement that all preceding structures be included, unless clearly indicated by the context.

Overview of Eyewear

Figure 2A:
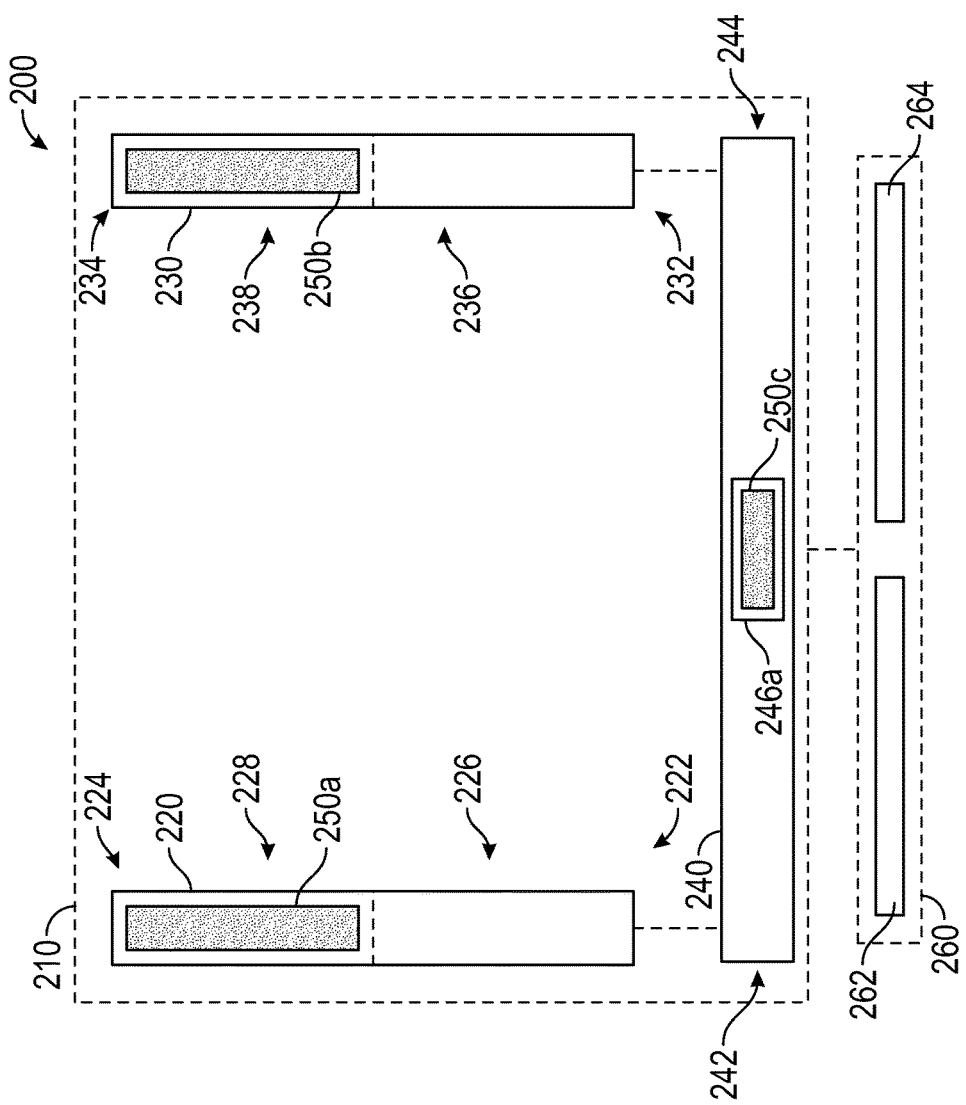
FIG. 2A illustrates a schematic of an embodiment of an eyewear having a traction surface on a support.
Figure 2B:
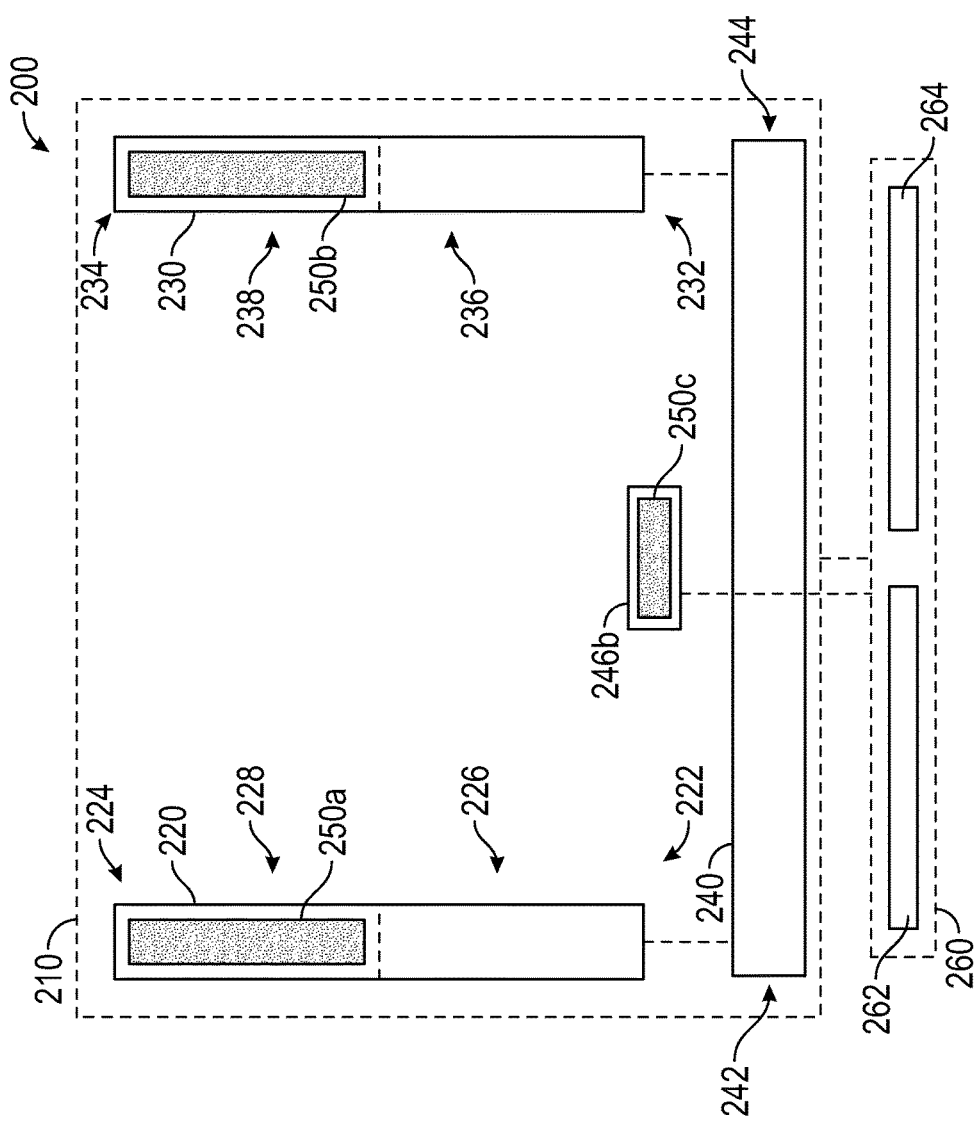
FIG. 2B illustrates a schematic of another embodiment of an eyewear having a traction surface on a support.
Figure 3:
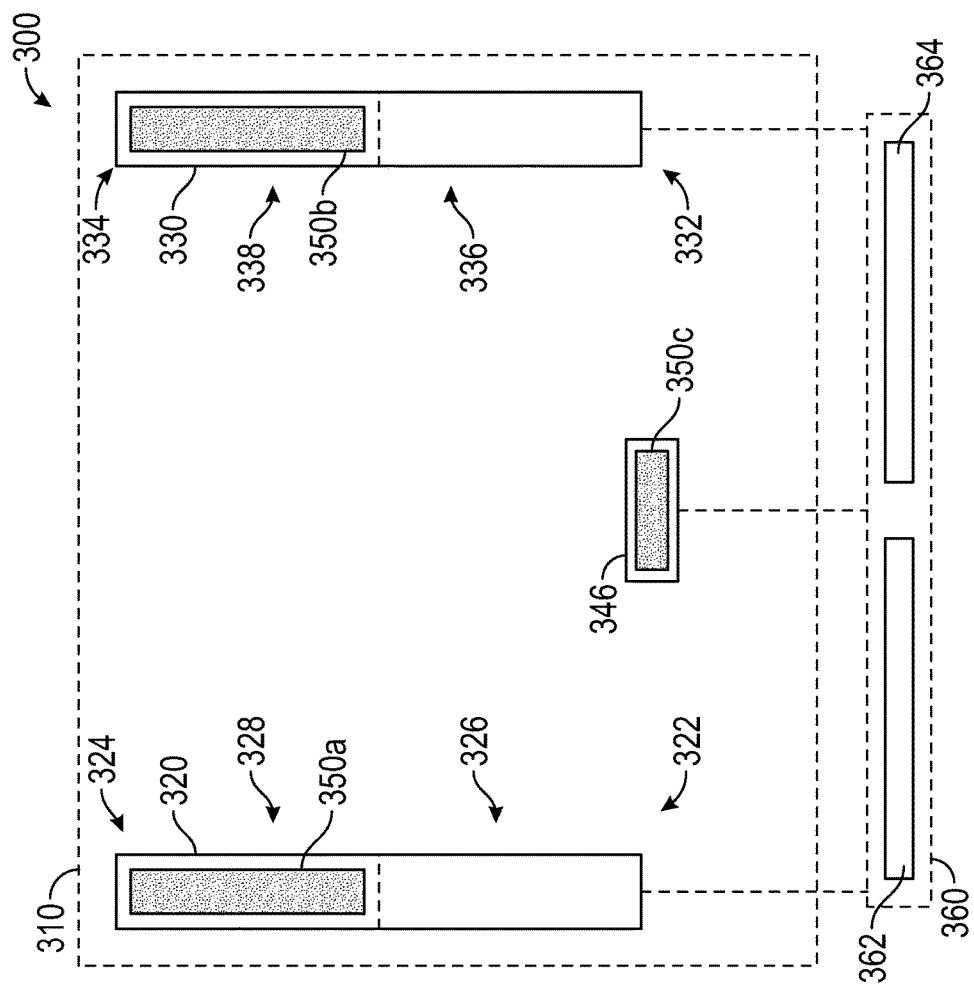
FIG. 3 illustrates a schematic of another embodiment of an eyewear having a traction surface on a support.

FIGS. 1-3 are schematic illustrations of various embodiments of eyewear 100, 200, 300. As shown in the illustrated embodiments, the eyewear 100, 200, 300 can include one or more supports 110, 210, 310. In some embodiments, the supports 110, 210, 310 can be configured to be supported on a head of a user or wearer.

As shown in the illustrated embodiments, the eyewear 100, 200, 300 can also include one or more traction surfaces 150, 250a-c, 350a-c coupled to or formed on or integrated into the one or more supports 110, 210, 310. In some embodiments, the one or more traction surfaces 150, 250a-c, 350a-c can be configured to retain the eyewear 100, 200, 300 on the user's face and resist or reduce the likelihood of slippage and/or removability in undesired directions while not resisting or allowing a greater degree of slippage and/or removability in desired directions. This can be beneficial in that the eyewear 100, 200, 300 will be less likely to slip while still allowing a user's to relatively easily remove the eyewear from the user's face.

For example, the one or more traction surfaces 150, 250a-c, 350a-c can be configured to retain the eyewear 100, 200, 300 on the user's nose and resist or reduce the likelihood of slippage and/or removability in one or more directions generally anteriorly and/or downwardly relative to the user's nose while not resisting or increasing the likelihood of slippage or removability in one or more generally or substantially opposite directions. In this manner, the eyewear 100, 200, 300 is less likely to slip off the user's nose when being worn. Moreover, when a user wishes to remove the eyewear from the user's face in a direction generally posteriorly and/or upwardly relative to the user's nose, the user can comfortably do so with little to no resistance.

As another example, the one or more traction surfaces 150, 250a-c, 350a-c can be configured to retain the eyewear 100, 200, 300 on the user's ears and/or a lateral side of the user's head and reduce the likelihood of slippage in a direction generally anteriorly relative to the user's ears and/or the lateral side of the user's head or any other direction as desired. In this manner, the eyewear 100, 200, 300 is less likely to slip forward relative to the user's head when being worn. Moreover, when a user wishes to remove the eyewear from the user's head in a direction generally upwardly relative to the user's head, the user can comfortably do so with little to no resistance.

As shown in the illustrated embodiments, the eyewear 100, 200, 300, can also include one or more lenses 160, 260, 360.

Embodiment of Traction Surface on Traction Member

With reference first to FIG. 1, an embodiment of an eyewear 100 is illustrated having a support 110. The support 110 can include a right earstem 120, a left earstem 130, a face 140, and a nosepiece 146. The right earstem 120 can include an anterior end 122, a posterior end 124, an anterior portion 126, and a posterior portion 128. The left earstem 130 can similarly include an anterior end 132, a posterior end 134, an anterior portion 136, and a posterior portion 138. The face 140 can include a right side 142 and a left side 144 and be configured to support a lens 160, such as a right lens 162 and left lens 164. In some embodiments, the face 140 can be configured to surround at least a portion or an entirety of the periphery of the lens 160 such as lenses 162, 164. For example, the face 140 can include partial or full orbitals.

In some embodiments, the earstems, such as right and/or left earstems 120, 130, the face 140 and/or the nosepiece 146 can be fabricated using one or more metals, polymers, or other relatively stiff and/or resilient materials that can have desirable lens securing and stabilizing properties while nevertheless enabling the eyewear to provide desirable flexural properties in the earstems, such as right and/or left earstems 120, 130 thereof. For example, in some embodiments, steel such as stainless, titanium and its alloys, carbon fiber, plastic, aluminum, polymers such as acetate, polyurethane, polyurea, polycarbonate, PC-ABS, ABS, PVC, nylon 6, nylon 6-6, and nylon 12, and other such materials can be used in the earstems, such as right and/or left earstems 120, 130, the face 140, and/or the nosepiece 146 to provide superior mechanical properties while reducing the weight of the support 110. Any suitable metals, plastics or other rigid and/or resilient materials can be used to form the support 110 to provide exceptional rigidity, durability, and wear resistance. Nevertheless, various features and aspects disclosed herein can be used in eyewear fabricated from any material, e.g., plastic, acetate, composite, metal, etc., or any combination thereof. The lens 160, such as a right and/or left lens 162, 164, may take any of a number of configurations and can be formed of sheet plastic, molded plastic, glass, etc., as determined by the application of the lens.

As shown in the illustrated embodiment, the right earstem 120, the left earstem 130, and/or the nosepiece 146 can be coupled to the face 140. For example, the right earstem 120 can be coupled to the right side 142 of the face 140 at or proximate an anterior end 122 of the right earstem 120, the left earstem 130 can be coupled to the left side 144 of the face 140 at or proximate an anterior end 132 of the left earstem 130, and the nosepiece 146 can be coupled to a portion of the face 140 between the right and left sides 142, 144. In some embodiments, the right earstem 120, the left earstem 130, and/or the nosepiece 146 can be permanently affixed to the face 140. A permanent attachment of the earstems, such as right and/or left earstems 120, 130, and/or the nosepiece 146, to the face 140 may be accomplished, for example, through molding or thermoplastic bonding. In some embodiments, the right earstem 120, the left earstem 130, and/or the nosepiece 146 can be rotatably coupled to the face 140 via a rotatable coupling such as, but not limited to, a snap fit coupling or fasteners including screws or pins or any other rotatable coupling as desired.

In some embodiments where the right and/or left earstems 120, 130 are rotatably coupled to the face 140, the right and/or left earstems 120, 130 can rotate from an open position, in which the eyewear 100 can be worn by a user, to a closed position, in which the eyewear 100 takes on a more compact form factor for storage, and vice versa.

With continued reference to the embodiment of eyewear 100 illustrated in FIG. 1, the eyewear 100 can include a traction surface 150. As noted above, the traction surface 150 can be configured to retain the eyewear 100, on the user's face and resist or reduce the likelihood of removal or slippage in undesired directions. In some embodiments, the traction surface 150 can be positioned on a traction member 152 and form at least a portion of an exterior surface of the traction member 152. The traction surface 150 can extend entirely around the periphery of the traction member 152 or can extend partially around the periphery of the traction member 152 such as along a bottom portion of the traction member 152, an inwardly facing portion of the traction member 152, and/or an outwardly facing portion of the traction member 152. As shown in the illustrated embodiment, the traction member 152 can be a component separate from the support 110. The retention member 152 can be coupled to a portion of the support 110. For example, the retention system 150 can be coupled to the right earstem 120, the left earstem 130, the face 140, and/or a combination of these components of the support 110.

In some embodiments, the coupling between the traction member 152 and the support 110 can be such that the traction member 152 can be removable from the support 110. For example, the traction member 152 can be coupled to the support 110 using removable fasteners such as threaded screws, threaded bolts, and the like. As another example, the traction member 152 can be coupled to the support 110 using removable fasteners such as a clip. In some embodiments, the traction member 152 can be formed from a material which exerts some degree of tackiness or grip on a surface. For example, the traction member 152 can be formed from materials such as, but not limited to polymers, such as acetate, polyurethane, polyurea, polycarbonate, PC-ABS, ABS, PVC, Nylon 6, Nylon 6-6, Nylon 12, silicone, latex, and rubber, metals such as steel, titanium, titanium alloys, and aluminum, composites, plastics, a combination of the above materials, and/or any other material or combination of materials as desired. In some embodiments, the materials can be 3D printed or injection molded. The traction member 152 can be retained on the support 110 via contact between the traction member 152 and the support 110. In some embodiments, the traction member 152 can be coupled to the portion of the support 110 using one or more permanent affixation methods such as, but not limited to, overmolding, one or more adhesives, and the like. In some embodiments, the traction member 152 can be unitarily formed with the portion of the support 110.

In some embodiments, the traction member 152 can have a length relative to another component of the eyewear 100 such as the support 110 or lens 160. For example, in some embodiments, the traction member 152 can have a length of between approximately 5% to approximately 60% of a length of an earstem, such as left and/or right earstems 120, 130, a length of between approximately 10% to approximately 50% of a length of an earstem, a length of between approximately 15% to approximately 40% of a length of an earstem, a length of between approximately 20% to approximately 30% of a length of an earstem, any sub-range within these ranges, or any percentage of the length of an earstem as desired, the length being a longitudinal length from an anterior end, such as anterior ends 122, 132, to a posterior end, such as posterior ends 124, 134. In some embodiments, the traction member 152 can have a length approximately equal to that of the posterior portion, such as posterior portions 128, 138. In some embodiments, the traction member 152 can have a length approximately equal to that of the nosepiece 146.

In some embodiments, the traction surface 150 can be configured to resist or to reduce or inhibit slippage between the support 110 and another surface in contact with the traction surface 150 such as, but not limited to, a user's skin in certain directions while resisting less or allowing a greater degree of slippage in other directions. In some embodiments where the traction surface 150 is positioned on the user's nose, the traction surface 150 can be configured such that the traction surface resists or reduces or inhibits slippage between the support 110 and the user's nose in a direction generally anteriorly and/or downwardly relative to the user's nose, while resisting less or allowing a greater degree of slippage in other directions, such as posteriorly and/or upwardly. As another example, in some embodiments where the traction surface 150 is positioned on or adjacent the user's ears and/or a lateral side of the user's head, the traction surface 150 can be configured such that the traction surface resists or reduces or inhibits slippage between the support 110 and the user's ear and/or a lateral side of the user's head in a direction generally anteriorly relative to the user's head while resisting less or allowing a greater degree of slippage in other directions, such as posteriorly, upwardly, and/or downwardly.

Embodiment of Traction Surface on Support

With reference next to FIGS. 2A and 2B, an embodiment of an eyewear 200 is illustrated having a support 210. The eyewear 200 can include or share any or all of the components, features and/or characteristics described above in connection with eyewear 100.

The support 210 can include a right earstem 220, a left earstem 230, a face 240 and a nosepiece, such as nosepieces 246a, 246b. The right earstem 220 can include an anterior end 222, a posterior end 224, an anterior portion 226, and a posterior portion 228. The left earstem 230 can similarly include an anterior end 232, a posterior end 234, an anterior portion 236, and a posterior portion 238. The face 240 can include a right side 242 and a left side 244 and be configured to support a lens 260, such as a right lens 262 and left lens 264. In some embodiments, the face 240 can be configured to surround at least a portion or an entirety of the periphery of the lens 260 such as lenses 262, 264. For example, the face 240 can include partial or full orbitals.

In some embodiments, the earstems, such as right and/or left earstems 220, 230, the face 240 and/or the nosepieces 246a, 246b can be fabricated using one or more metals, polymers, or other relatively stiff and/or resilient materials that can have desirable lens securing and stabilizing properties while nevertheless enabling the eyewear to provide desirable flexural properties in the earstems, such as right and/or left earstems 220, 230 thereof. For example, in some embodiments, titanium, carbon fiber, plastic, aluminum, and other such materials can be used in the earstems, such as right and/or left earstems 220, 230, the face 240, and/or the nosepieces 246a, 246b to provide superior mechanical properties while reducing the weight of the support 210. Any suitable metals, plastics or other rigid and/or resilient materials can be used to form the support 210 to provide exceptional rigidity, durability, and wear resistance. Nevertheless, various features and aspects disclosed herein can be used in eyewear fabricated from any material, e.g., plastic, acetate, composite, metal, etc., or any combination thereof. The lens 260, such as a right and/or left lens 262, 264, may take any of a number of configurations and can be formed of sheet plastic, molded plastic, glass, etc., as determined by the application of the lens.

As shown in the illustrated embodiment, the right earstem 220, the left earstem 230, and/or the nosepieces 246a, 246b can be coupled to the face 240 and/or the lens 260. For example, the right earstem 220 can be coupled to the right side 242 of the face 240 at or proximate an anterior end 222 of the right earstem 220, the left earstem 230 can be coupled to the left side 244 of the face 240 at or proximate an anterior end 232 of the left earstem 230, and the nosepieces 246a, 246b can be coupled to a portion of the face 240 between the right and left sides 242, 244 and/or the lens 260 between lateral sides of the lens 260 or between two separate lenses, such as right and left lenses 262, 264. In some embodiments, the right earstem 220, the left earstem 230, and/or the nosepieces 246a, 246b can be permanently affixed to the face 240 and/or the lens 260. A permanent attachment of the earstems, such as right and/or left earstems 220, 230 and/or the nosepieces 246a, 246b, to the face 240 and/or the lens 260 may be accomplished, for example, through molding or thermoplastic bonding. For example, as shown in FIG. 2A, the nosepiece 246a can be a portion of the face 240 itself. In some embodiments, such as that shown in FIG. 2B, the nosepiece 246b can be coupled to the lens 260 without coupling to the face 240. In some embodiments, the right earstem 220, the left earstem 230, and/or the nosepiece 246a can be rotatably coupled to the face 240 via a rotatable coupling such as, but not limited to, a snap fit coupling or fasteners including screws or pins or any other rotatable coupling as desired.

In some embodiments where the right and/or left earstems 220, 230 are rotatably coupled to the face 240 and/or the lens 260, the right and/or left earstems 220, 230 can rotate from an open position, in which the eyewear 200 can be worn by a user, to a closed position, in which the eyewear 200 takes on a more compact form factor for storage, and vice versa.

With continued reference to the embodiment of eyewear 200 illustrated in FIGS. 2A and 2B, the eyewear 200 can include one or more traction surfaces 250a, 250b, 250c. As noted above, the traction surfaces 250a, 250b, 250c can be configured to retain the eyewear 200, on the user's face and resist or reduce the likelihood of removal or slippage in undesired directions. In some embodiments, the traction surfaces 250a, 250b, 250c can be coupled to the right earstem 220, the left earstem 230, and/or the nosepieces 246a, 246b respectively.

As shown in the illustrated embodiment, the traction surfaces 250a, 250b, 250c can be formed on portions of the support 210. For example, the traction surface 250a can be molded together with the right earstem 220, the traction surface 250b can be molded together with the left earstem 230, and/or the traction surface 250c can be molded together with the nosepieces 246a, 246b respectively. As such, one or more of traction surface 250a, 250b, 250c can be integrally formed with one or more components of the support 210 such that the one or more traction surfaces 250a, 250b, 250c can form a unitary structure with one or more components of the support 210. In some instances in which the traction surfaces 250a, 250b, 250c are molded together with one or more components of the support 210, the traction surfaces 250a, 250b, 250c can be monolithically formed from the same material as the components of the support 210 on which the traction surfaces 250a, 250b, 250c are formed. In some instances in which the traction surfaces 250a, 250b, 250c are molded together with one or more components of the support 210, the traction surfaces 250a, 250b, 250c can be formed from material different from the material of the components of the support 210 on which the traction surfaces 250a, 250b, 250c are formed. In some embodiments, one or more of the traction surfaces, such as traction surfaces 250a, 250b, can be separate from components of the support 210, such as earstems 220, 230. Such traction surfaces, for example, may be slipped over portions of the support 210, such as earstems 220, 230.

The traction surfaces 250a-c can extend entirely around the periphery of the components on which the traction surfaces 250a-c are formed or can extend partially around the periphery of the components on which the traction surfaces 250a-c are formed. For example, traction surface 250a can extend entirely around the periphery of the right earstem 220 or can extend partially around the periphery such as along a bottom portion of the right earstem 220, an inwardly facing portion of the right earstem 220, and/or an outwardly facing portion of the right earstem 220. The traction surface 250b can include similar characteristics with respect to the left earstem 230.

In some embodiments, the traction surfaces 250a, 250b, 250c can have lengths relative to one or more components of the eyewear 200 such as the support 210 or lens 260. For example, in some embodiments, the traction surface 250a can have a length of between approximately 5% to approximately 60% of a length of the right earstem 220, a length of between approximately 10% to approximately 50% of a length of the right earstem 220, a length of between approximately 15% to approximately 40% of a length of the right earstem 220, a length of between approximately 20% to approximately 30% of a length of the right earstem 220, any sub-range within these ranges, or any percentage of the length of the right earstem 220 as desired, the length being a longitudinal length from the anterior end 222 to the posterior end 224. In some embodiments, the traction surface 250a can extend at or proximate a posterior end 224 of the right earstem 220 and extend approximately to the midpoint of the right earstem 220. The traction surface 250b can have similar lengths relative to the left earstem 230. The traction surface 250c can have a length sufficient to extend along the entirety of the nosepieces 246a, 246b or a portion thereof.

In some embodiments, the traction surfaces 250a, 250b, 250c can be configured to resist or to reduce or inhibit slippage between the support 210 and another surface in contact with the traction surfaces 250a, 250b, 250c such as, but not limited to, a user's skin in certain directions while resisting less or allowing a greater degree of slippage in other directions. In some embodiments where the traction surface, such as traction surface 250c, is positioned on the user's nose, the traction surface can be configured such that the traction surface resists or reduces or inhibits slippage between the support 210 and the user's nose in a direction generally anteriorly and/or downwardly relative to the user's nose, while resisting less or allowing a greater degree of slippage in other directions, such as posteriorly and/or upwardly. As another example, in some embodiments where the traction surface, such as traction surfaces 250a, 250b, 250c, is positioned on or adjacent the user's ears and/or a lateral side of the user's head, the traction surface can be configured such that the traction surface resists or reduces or inhibits slippage between the support 210 and the user's ear and/or a lateral side of the user's head in a direction generally anteriorly relative to the user's head while resisting less or allowing a greater degree of slippage in other directions, such as posteriorly, upwardly, and/or downwardly.

Embodiment of Traction Surfaces on Faceless Support

With reference next to FIG. 3, an embodiment of an eyewear 300 is illustrated having a support 310. The eyewear 300 can include or share any or all of the components, features and/or characteristics described above in connection with eyewear 100, 200.

The support 310 can include a right earstem 320, a left earstem 330, and a nosepiece 346. The right earstem 320 can include an anterior end 322, a posterior end 324, an anterior portion 326, and a posterior portion 328. The left earstem 330 can similarly include an anterior end 332, a posterior end 334, an anterior portion 336, and a posterior portion 338.

In some embodiments, the earstems, such as right and/or left earstems 320, 330, and/or the nosepiece 346 can be fabricated using one or more metals, polymers, or other relatively stiff and/or resilient materials that can have desirable lens securing and stabilizing properties while nevertheless enabling the eyewear to provide desirable flexural properties in the earstems, such as right and/or left earstems 320, 330 thereof. For example, in some embodiments, titanium, carbon fiber, plastic, aluminum, and other such materials can be used in the earstems, such as right and/or left earstems 320, 330, and/or the nosepiece 346 to provide superior mechanical properties while reducing the weight of the support 310. Any suitable metals, plastics or other rigid and/or resilient materials can be used to form the support 310 to provide exceptional rigidity, durability, and wear resistance. Nevertheless, various features and aspects disclosed herein can be used in eyewear fabricated from any material, e.g., plastic, acetate, composite, metal, etc., or any combination thereof. The lens 360, such as a right and/or left lens 362, 364, may take any of a number of configurations and can be formed of sheet plastic, molded plastic, glass, etc., as determined by the application of the lens.

As shown in the illustrated embodiment, the right earstem 320, the left earstem 330, and/or the nosepiece 346 can be coupled to the 360. For example, the right earstem 320 can be coupled to a right side of the lens 360 or to the right lens 362 at or proximate an anterior end 322 of the right earstem 320, the left earstem 330 can be coupled to the left side of the lens 360 or to the left lens 364 at or proximate an anterior end 332 of the left earstem 330, and the nosepiece 346 can be coupled to a portion of the lens 360 between lateral sides of the lens 360 or between two separate lenses, such as right and left lenses 362, 364. In some embodiments, the right earstem 320, the left earstem 330, and/or the nosepiece 346 can be permanently affixed to the lens 360. A permanent attachment of the earstems, such as right and/or left earstems 320, 230, and/or the nosepiece 346, to lens 360 may be accomplished, for example, through molding or thermoplastic bonding. In some embodiments, the right earstem 320, the left earstem 330, and/or the nosepiece 346 can be rotatably coupled to the lens 360 via a rotatable coupling such as, but not limited to, a snap fit coupling or fasteners including screws or pins or any other rotatable coupling as desired.

In some embodiments where the right and/or left earstems 320, 330 are rotatably coupled to the lens 360, the right and/or left earstems 320, 330 can rotate from an open position, in which the eyewear 300 can be worn by a user, to a closed position, in which the eyewear 300 takes on a more compact form factor for storage, and vice versa.

With continued reference to the embodiment of eyewear 300 illustrated in FIG. 3, the eyewear 300 can include one or more traction surfaces 350a, 350b, 350c. As noted above, the traction surfaces 350a, 350b, 350c can be configured to retain the eyewear 300, on the user's face and resist or reduce the likelihood of removal or slippage in undesired directions. In some embodiments, the traction surfaces 350a, 350b, 350c can be coupled to the right earstem 320, the left earstem 330, and/or the nosepiece 346 respectively.

As shown in the illustrated embodiment, the traction surfaces 350a, 350b, 350c can be formed on portions of the support 310. For example, the traction surface 350a can be molded together with the right earstem 320, the traction surface 350b can be molded together with the left earstem 330, and/or the traction surface 350c can be molded together with the nosepiece 346 respectively. As such, one or more of traction surface 350a, 350b, 350c can be integrally formed with one or more components of the support 310 such that the one or more traction surfaces 350a, 350b, 350c can form a unitary structure with one or more components of the support 310. In some instances in which the traction surfaces 350a, 350b, 350c are molded together with one or more components of the support 310, the traction surfaces 350a, 350b, 350c can be monolithically formed from the same material as the components of the support 310 on which the traction surfaces 350a, 350b, 350c are formed. In some instances in which the traction surfaces 350a, 350b, 350c are molded together with one or more components of the support 310, the traction surfaces 350a, 350b, 350c can be formed from material different from the material of the components of the support 310 on which the traction surfaces 350a, 350b, 350c are formed. In some embodiments, one or more of the traction surfaces, such as traction surfaces 350a, 350b, can be separate from components of the support 310, such as earstems 320, 330. Such traction surfaces, for example, may be slipped over portions of the support 310, such as earstems 320, 330.

The traction surfaces 350a-c can extend entirely around the periphery of the components on which the traction surfaces 350a-c are formed or can extend partially around the periphery of the components on which the traction surfaces 350a-c are formed. For example, traction surface 350a can extend entirely around the periphery of the right earstem 320 or can extend partially around the periphery such as along a bottom portion of the right earstem 320, an inwardly facing portion of the right earstem 320, and/or an outwardly facing portion of the right earstem 320. The traction surface 350b can include similar characteristics with respect to the left earstem 330.

In some embodiments, the traction surfaces 350a, 350b, 350c can have lengths relative to one or more components of the eyewear 300 such as the support 310 or lens 360. For example, in some embodiments, the traction surface 350a can have a length of between approximately 5% to approximately 60% of a length of the right earstem 320, a length of between approximately 10% to approximately 50% of a length of the right earstem 320, a length of between approximately 15% to approximately 40% of a length of the right earstem 320, a length of between approximately 20% to approximately 30% of a length of the right earstem 320, any sub-range within these ranges, or any percentage of the length of the right earstem 320 as desired, the length being a longitudinal length from the anterior end 322 to the posterior end 324. In some embodiments, the traction surface 350a can extend at or proximate a posterior end 324 of the right earstem 320 and extend approximately to the midpoint of the right earstem 320. The traction surface 350b can have similar lengths relative to the left earstem 330. The traction surface 350c can have a length sufficient to extend along the entirety of the nosepiece 346 or a portion thereof.

In some embodiments, the traction surfaces 350a, 350b, 350c can be configured to resist or to reduce or inhibit slippage between the support 310 and another surface in contact with the traction surfaces 350a, 350b, 350c such as, but not limited to, a user's skin in certain directions while resisting less or allowing a greater degree of slippage in other directions. In some embodiments where the traction surface, such as traction surface 350c, is positioned on the user's nose, the traction surface can be configured such that the traction surface resists or reduces or inhibits slippage between the support 310 and the user's nose in a direction generally anteriorly and/or downwardly relative to the user's nose, while resisting less or allowing a greater degree of slippage in other directions, such as posteriorly and/or upwardly. As another example, in some embodiments where the traction surface, such as traction surfaces 350a, 350b, 350c, is positioned on or adjacent the user's ears and/or a lateral side of the user's head, the traction surface can be configured such that the traction surface resists or reduces or inhibits slippage between the support 310 and the user's ear and/or a lateral side of the user's head in a direction generally anteriorly relative to the user's head while resisting less or allowing a greater degree of slippage in other directions, such as posteriorly, upwardly, and/or downwardly.

While the traction surfaces are described in connection with supports 110, 210, 310, it is to be understood that the traction surfaces can be applied to lenses 160, 260, 360 or any other structure or component of an eyewear. Moreover, while the traction surfaces are described in connection with eyewear 100, 200, 300, the traction surfaces as described herein can be applied to other types of wearable devices including, but not limited to, goggles, helmets, outerwear such as apparel, jewelry such as earrings, bracelets and necklaces, watches, personal electronic devices such as a communication device, and the like.

Embodiment of Eyewear Worn by User

FIGS. 4-7 illustrate an embodiment of eyewear 400 worn on a user's head 480. The eyewear 400 can include or share any or all of the components, features and/or characteristics described above in connection with eyewear 100, 200, 300.

Figure 4:
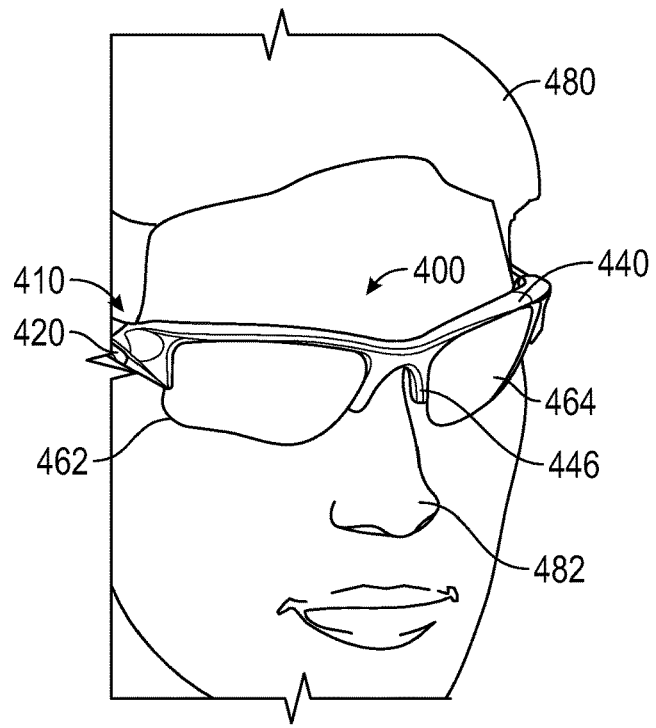
FIG. 4 illustrates a perspective view of an embodiment of an eyewear worn on a user's head.
Figure 5:
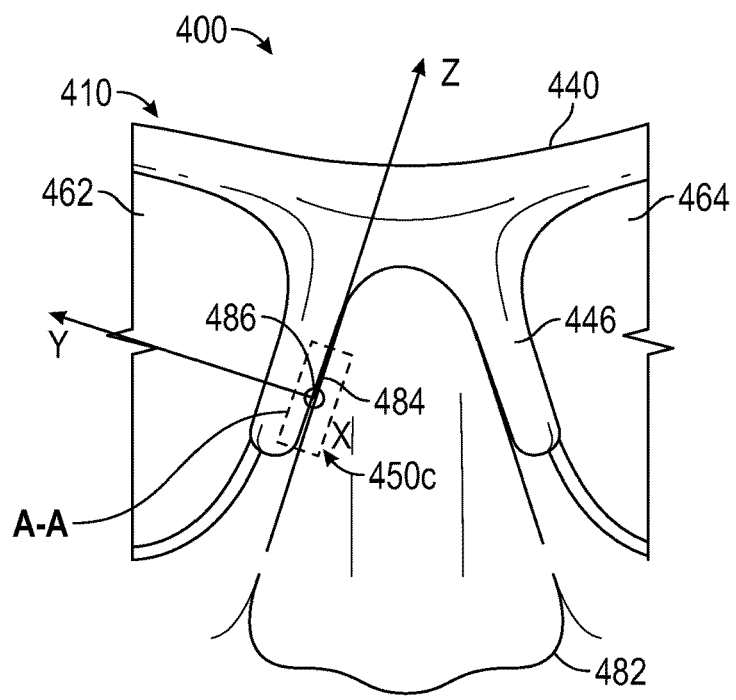
FIG. 5 illustrates a front view of the eyewear of FIG. 4.

With reference first to FIGS. 4 and 5, the eyewear 400 can include a support 410 having a right earstem 420, a left earstem 430, and a face 440. As shown the eyewear 400 is a dual-lens eyewear having a right lens 462 and a left lens 464 with the face 440 having an integral nosepiece 446.

With reference to FIG. 5 which illustrates a front view of FIG. 4, the nosepiece 446 of the face 440 can include a traction surface 450c which can form at least part of an exterior surface of the nosepiece 446. The traction surface 450c can be configured to contact the user's nose along a contact surface 484, the contact surface 484 including multiple points of contact between the user's nose and the traction surface 450c. As shown in the illustrated embodiment, at a contact point 486 with the contact surface 484, a three-dimensional coordinate system is illustrated. With respect to this three-dimensional coordinate system, the y-axis is normal to the contact surface 484 at the contact point 486, the x-axis is orthogonal to the y-axis and parallel to a horizontal plane (e.g., an anatomically transverse plane) at the contact point 486, and the z-axis is orthogonal to both the x-axis and the y-axis at the contact point 486. Accordingly, the x-z plane is tangent to the contact surface 484 at the contact point 486. As shown in the illustrated embodiment, the y-axis extends in a direction away from the user's nose 482, the x-axis extends in a direction generally anteriorly relative to the user's nose 482, and the z-axis extending in a direction generally upwardly relative to the user's nose 482.

Figure 6:
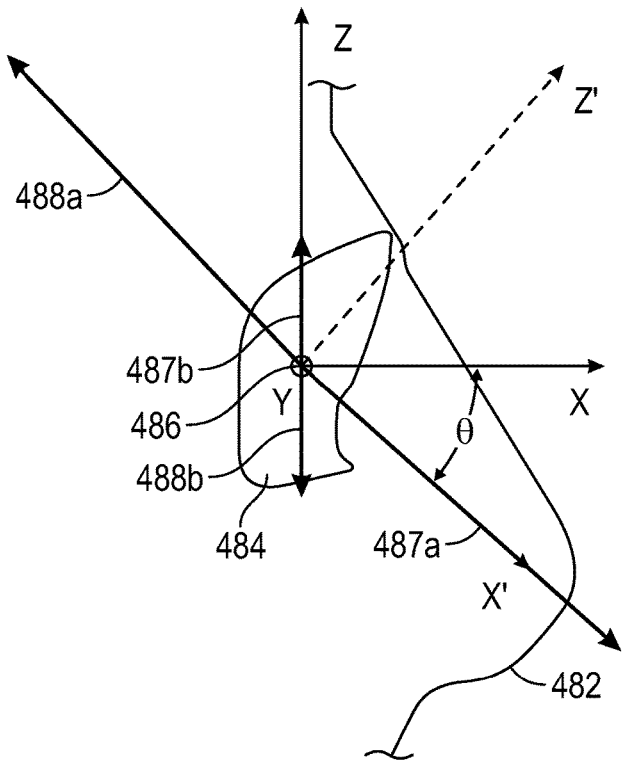
FIG. 6 illustrates a schematic vertical, cross-sectional view of the eyewear of FIG. 5 orthogonal to the y-axis.

With reference next to FIG. 6 which illustrates a schematic of the user's nose 482 and contact surface 484 along a plane orthogonal to the y-axis, in some embodiments, the traction surface (not shown) can be configured such that it exerts a force on the contact surface 484 to counteract an applied force upon the eyewear 400. For example, as shown in the illustrated embodiment, the traction surface can be configured to exert a traction force 488a to counteract an applied force 487a upon the eyewear 400. This can beneficially help to retain the eyewear 400 in place relative to the user's nose 482. The force 487a can be caused, for example, due to the effect of gravity and/or due to movement of the user relative to the eyewear 400.

In some instances, the amount of traction force the traction surface can apply upon the contact surface 484 before the traction surface slips relative to the contact surface 484 can vary depending on the directionality of the applied force. For example, as shown in the illustrated embodiment, the traction surface can exert a greater amount of traction force 488a before slipping when the applied force 487a is in a direction typical for eyewear slippage, such as a direction which is generally anteriorly relative to the user's nose 482 and/or a direction generally downwardly relative to the user's nose 482. In some instances, when the eyewear is subject to the applied force 487a in such eyewear slippage direction, the traction surface can exert such traction force 488a before slipping which is greater than a traction force that would be exerted before slipping as a result of an applied force upon the eyewear in another direction within the plane. For example, with the applied force 487a in such slippage direction, the traction surface can exert such traction force 488a before slipping which is greater than the mean and/or median traction force exerted before slipping to counteract applied forces in one or more other directions within the plane, or in all other directions within the plane. The traction surface can exert a lesser amount of traction force 488b before slipping when the applied force 487b is in a direction typical for eyewear removal, such as a direction which is generally upwardly relative to the user's nose 482. In some instances, when subject to an applied force 487b in such eyewear removal direction, the traction surface can exert a traction force 488b before slipping which is less than the mean and/or median traction force exerted before slipping to counteract applied forces in one or more other directions within the plane, or in all other directions within the plane. As shown in the illustrated embodiment, the traction force 488b before slipping can be less than the traction force 487b before slipping.

As such, the traction surface can be configured such that it has a higher resistance to shear of an interface between the traction surface and a contact surface in desired directions and can be configured such that it has a lower resistance to shear of the interface in other desired directions. This can be particularly beneficial as an eyewear 400 may most likely slip from a user's nose in a direction generally anteriorly relative to the user's nose 482 and/or in a direction generally downwardly relative to the user's nose 482. A greater amount of traction force before slipping can assist in retaining the eyewear 400 on the user's face. Moreover, a user may deliberately remove the eyewear 400 from the user's face in a direction generally upwardly relative to the user's nose 482. A lesser amount of force would therefore be required to remove the eyewear 400 from the user's face in this direction or in any other contemplated direction for a deliberate removal force.

It is to be understood that the frame of reference (e.g., the axes) described herein are discussed in connection within standard contexts with a user's head in an upright vertical position. For example, the x-axis is described above as being parallel to a horizontal plane such as the anatomical transverse plane. This can be measured, for example, on a standard headform such as, but not limited to, an Alderson headform, an EN168 headform, a CSA Z262.2-14 headform, or any other standard headform.

However, it also is to be understood that the frame of reference described herein may be shifted in other contexts. For example, in some instances, the frame of reference may be shifted for different sporting activities in which a user's face is angled towards the ground (a "heads-down" activity) which could include, for example, sprinting, skiing, or bicycle racing. The frame of reference may in other instances be shifted for sporting activities in which a user's face is angled away from the ground. It is contemplated that the directions of lesser, substantially minimum, and/or minimum traction forces and greater, substantially maximum, and/or maximum forces can be configured for different activities. For example, a first traction member can be configured for use during standard activities (i.e., head in an upright vertical position) and a second traction member can be configured for use during heads-down activities. As another example, a traction member can be configured for use during activities in which a user may switch between an upright vertical head position to a heads-down position and vice-versa.

The traction surface can be configured such that it has a higher resistance to peel at an interface between the traction surface and a contact surface in one or more desired directions and can be configured such that it has a lower resistance to peel at the interface in one or more other desired directions. For example, the traction surface can be configured such that it provides a first resistance to peel force in a first direction and a second resistance to peel force in a second direction, the first resistance being greater than the second resistance.

As shown in the illustrated embodiment, in some examples, the traction surface can exert a relatively greater amount of traction force before slipping when the applied force is in a direction generally anteriorly relative to the user's nose 482 (e.g., in a positive direction along the x-axis) and/or downwardly relative to the user's nose 482 (e.g., in a negative direction along the z-axis). In some instances, this direction can be generally parallel to a slope of the user's nose. This can correspond to a direction that an eyewear would generally slip on the user's nose due to the effect of gravity and/or due to movement of the user relative to the eyewear 400. This is illustrated in FIG. 6 with an angle θ relative to the x-axis. For example, when subject to an applied force in such eyewear slippage direction, the traction surface can exert a traction force before slipping which is greater than the mean and/or median traction force exerted before slipping to counteract applied forces in one or more other directions within the plane, or in all other directions within the plane. In some instances, the traction surface can exert a maximum, or substantially maximum, amount of traction force before slipping when the applied force is in such slippage direction.

In some embodiments, the traction surface can exert a relatively greater or maximum amount of traction force before slipping when the applied force forms an acute angle with the x-axis (e.g., in an anterior direction relative to the user's nose) and/or when the applied force forms an obtuse angle with the z-axis (e.g., in a downward direction relative to the user's nose). In some embodiments, when the applied force forms an acute angle with the x-axis, the traction surface can exert a relatively greater or maximum amount of traction force before slipping when the applied force is more parallel with the x-axis than perpendicular to the x-axis and/or when the applied force forms an obtuse angle with the z-axis. In some embodiments, when the applied force forms an acute angle with the x-axis, the traction surface can exert a relatively greater or maximum amount of traction force before slipping when the applied force is more perpendicular to the x-axis than parallel with the x-axis and/or when the applied force forms an obtuse angle with the z-axis. For example, the traction surface can exert a relatively greater or maximum amount of traction force before slipping when the applied force forms an angle of between approximately 50 degrees to approximately 70 degrees with the x-axis and when the applied force forms an obtuse angle with the z-axis. This angle could, for example, be generally parallel to the slope of the user's nose. In some embodiments, when the applied force forms an acute angle with the x-axis, the traction surface can exert a relatively greater or maximum amount of traction force before slipping when the applied force forms an approximately 45 degree angle with the x-axis and/or when the applied force forms an obtuse angle with the z-axis.

As shown in the illustrated embodiment, the traction surface can exert a relatively lower amount of traction force before slipping when the applied force is in a direction generally upwardly relative to the user's nose 482 (e.g., in a positive direction along the z-axis) and/or when the applied force is in a direction generally posteriorly or anteriorly relative to the user's nose 482 (e.g., along the x-axis). This can correspond to a direction that a user may deliberately remove the eyewear 400 from the user's face. For example, when subject to an applied force in such eyewear removal direction, the traction surface can exert a traction force before slipping which is less than the mean and/or median traction force exerted before slipping to counteract applied forces in one or more other directions within the plane, or in all other directions within the plane. In some instances, the traction surface can exert a minimum, or substantially minimum, amount of traction force before slipping when the applied force is in such removal direction. In some instances, this traction force can be less than the traction force exerted before slipping described above.

In some embodiments, the traction surface can exert a relatively lower or minimum amount of traction force before slipping when the applied force forms an acute angle with the x-axis (e.g., in an anterior direction relative to the user's nose) and/or when the applied force forms an acute angle with the z-axis (e.g., in an upward direction relative to the user's nose). For example, the traction surface can exert a relatively lower or minimum amount of traction force before slipping when the applied force forms an angle of between approximately 20 degrees to approximately 40 degrees with the x-axis and when the applied force forms an acute angle with the z-axis. This angle could, for example, be generally orthogonal to the slope of the user's nose. In some embodiments, the traction surface can exert a relatively lower or minimum amount of traction force before slipping when the applied force forms an obtuse angle with the x-axis (e.g., in a posterior direction relative to the user's nose) and/or when the applied force forms an acute angle with the z-axis. In some embodiments, the traction surface can exert a relatively lower or minimum amount of traction force before slipping when the applied force forms an obtuse angle with the x-axis and/or when the applied force forms an obtuse angle with the z-axis.

It is to be understood that the traction surface can be configured to exert a relatively greater amount of traction force before slipping in one or more directions as compared to the amount of traction force exerted before slipping in one or more other directions. As noted above, in some embodiments, the traction surface can exert a greater amount of traction force before slipping when the applied force forms an acute angle with the x-axis (e.g., in an anterior direction relative to the user's nose) and when the applied force forms an obtuse angle with the z-axis (e.g., in a downward direction relative to the user's nose) as compared to the amount of traction force the traction surface can exert before slipping when the applied force forms an acute angle with the z-axis (e.g., in an upward direction relative to the user's nose) and when the applied force forms an acute angle with the x-axis (e.g., in an anterior direction relative to the user's nose). However, it is to be understood this is an example comparison of directions for varying traction forces. The traction surface can exert a relatively greater amount of traction force in other directions. This can be beneficial, for example, when the traction surfaces are utilized in connection with different types of activities in which the direction of applied forces may differ. As noted above, the traction member can be configured for use during activities when the user's head is generally in an upright position and/or during activities in which the user's head is generally in a "heads-down" position. It is to be understood that the eyewear slippage direction and/or eyewear removal direction could differ as a result of the position of the user's head. Moreover, it is to be understood that other forces can also play a role in the desired traction member characteristics. For example, the effects of atmospheric forces (e.g., wind) and other forces (e.g., projectiles) may be taken into account.

Figure 7:
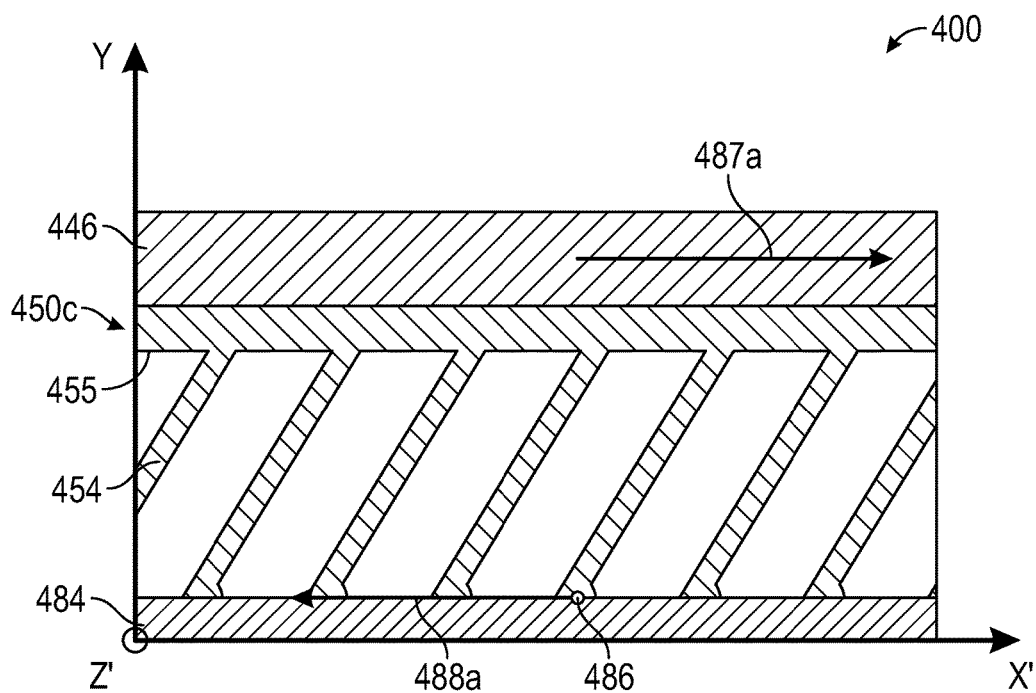
FIG. 7 illustrates a zoomed, schematic view of the eyewear of FIG. 4 along the box labeled A-A in FIG. 5.

With reference next to FIG. 7, which illustrates a schematic of the traction surface 450c contacting a contact surface 484 of a user's nose (not shown), the traction surface 450c can include one or more protrusions 454 extending from a surface 455 of the traction surface 450c, the ends of the one or more protrusions 454 configured to contact the contact surface 484. As shown in the illustrated embodiment, the protrusions are angled relative to the surface 455 of the traction surface 450c with a component (along the x'-axis in this case) opposite the direction of an applied force 487a in which the traction surface 450c can exert a relatively greater or maximum amount of traction force 488a before slipping. In some embodiments, the protrusions 454 can be at an angle which is more perpendicular to the surface 455 than parallel. In some embodiments, the protrusions 454 can be at an angle which is more parallel to the surface 455 than perpendicular. In some embodiments, the protrusions 454 can be at an angle which is generally equivalently parallel to the surface 455 as it is perpendicular to the surface 455. Although the traction surface 450c is shown separately from the nosepiece 446, the traction surface 450c can be integrally formed with the nosepiece 446 and/or can be formed from the same material.

The protrusions 454 can be in the form of pillars, such as rectangular or cylindrical pillars. The protrusions 454 can have lengths, along a longitudinal axis of the protrusions 454, in the nano or micro scale. This can beneficially reduce or eliminate visibility of individual protrusions 454 with the naked eye. In some instances, this can beneficially provide a more aesthetically pleasing look. This can enhance the traction surface's ability to resist peeling from the contact surface. In some instances, this can beneficially reduce the likelihood that the traction surface detaches from the contact surface. This can enhance the traction surface's ability to follow the contours of the skin. This can beneficially increase the traction force the traction surface can apply for a given amount of applied force. In some embodiments, the protrusions 454 can have lengths of approximately 500 μm to approximately 1 mm.

In some embodiments, the protrusions 454 can be formed from multiple materials and/or materials having different properties. For example, an interior portion of the protrusions 454 can be formed from a material having a greater stiffness than a material forming an exterior portion of the protrusions 454.

Embodiment of Multi-Portion Traction Surface

Figure 8:
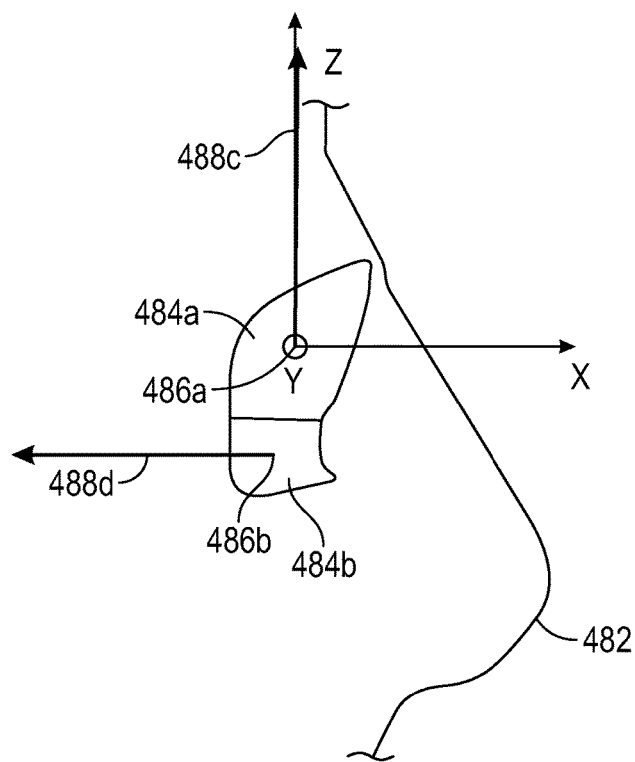
FIG. 8 illustrates a schematic view of another embodiment of a contact surface.

In some embodiments, the traction member can include multiple portions with different directional property. For example, with reference to FIG. 8 which illustrates a schematic of the user's nose 482 and contact surface having an upper portion 484a and a lower portion 484b, the traction surface (not shown) can be configured to have different directional properties. For example, as shown in the illustrated embodiment, the traction surface contacting the upper portion 484a of the contact surface can be configured can exert a relatively greater or maximum amount of traction force 488c before slipping when the applied force is in a direction generally downwardly relative to the user's nose 482. The traction surface contacting the lower portion 484b of the contact surface can be configured can exert a relatively greater or maximum amount of traction force 488d before slipping when the applied force is in a direction generally anteriorly relative to the user's nose 482. In some embodiments, the traction surface can be formed such that the protrusions forming the traction surface along portions which contact the upper portion 484a of the contact surface are angled generally downwardly relative to the user's nose 482 and that the protrusions forming the traction surface along portions which contact the lower portion 484a of the contact surface are angled generally anteriorly relative to the user's nose 482.

Figure 9:
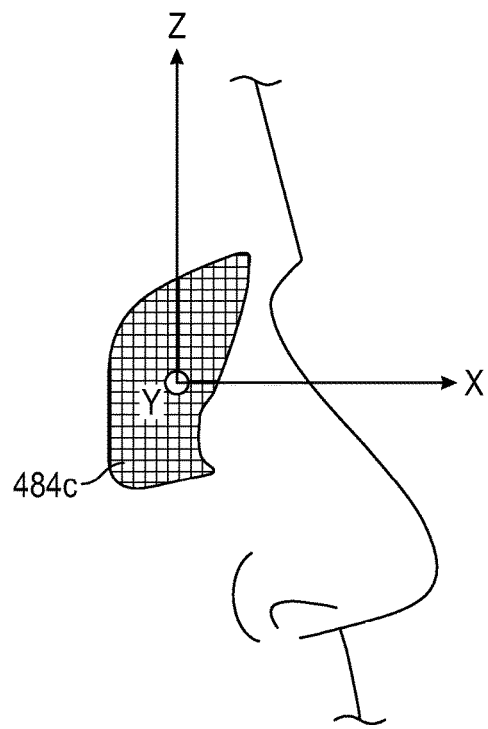
FIG. 9 illustrates a schematic view of another embodiment of a contact surface.

In some instances, the combined effect of the traction surface on upper portion 484a and lower portion 484b can be such that the traction surface can have one or more properties similar to or the same as one or more of those described with respect to the embodiment of the traction surface of FIG. 6. It is also contemplated that the traction surface can comprise more than two subsections as shown in FIG. 9.

Embodiments of Surfaces Contacting User's Ear and Head

Figure 10:
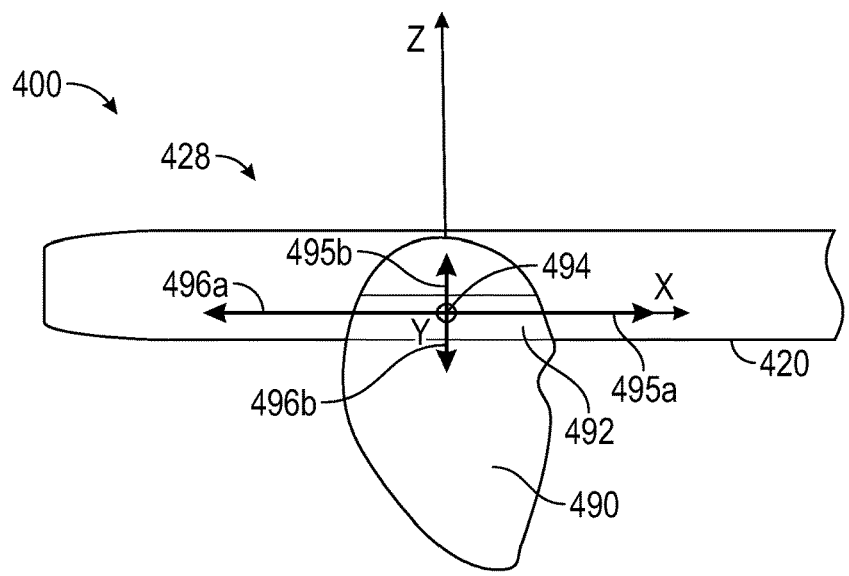
FIG. 10 illustrates a schematic view of the eyewear of FIG. 4 positioned along a user's ear.
Figure 11:
FIG. 11 illustrates a schematic view of an embodiment of a traction assembly.
Figure 12:
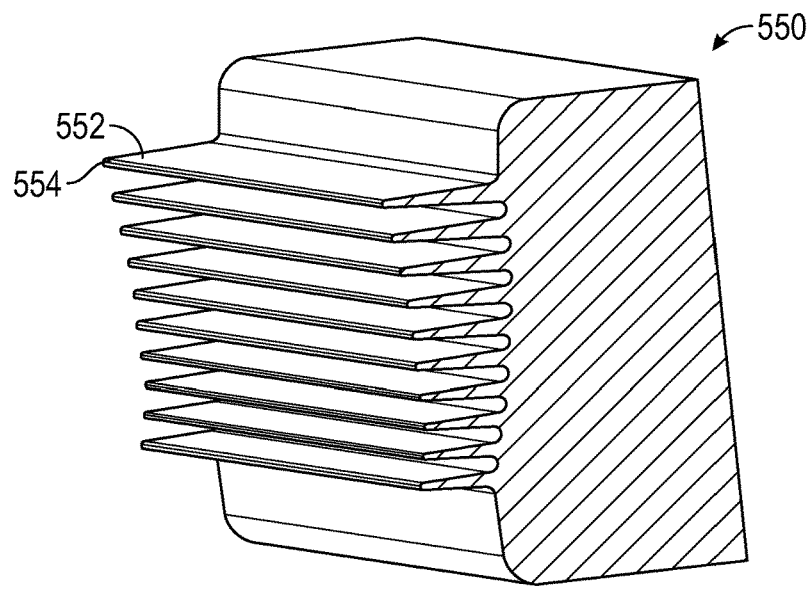
FIG. 12 illustrates a perspective view of the traction assembly of FIG. 11.
Figure 13:
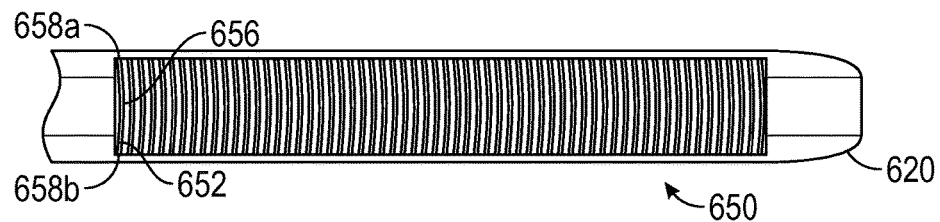
FIG. 13 illustrates a schematic view of another embodiment of a traction assembly.
Figure 14:
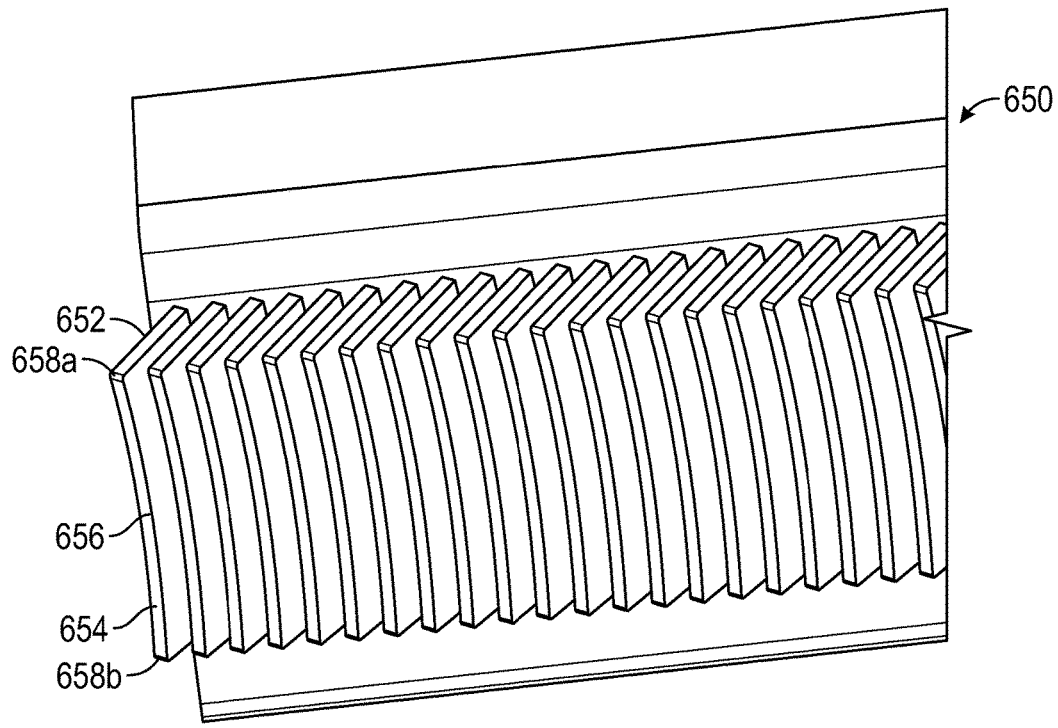
FIG. 14 illustrates a perspective view of the traction assembly of FIG. 13.
Figure 15:
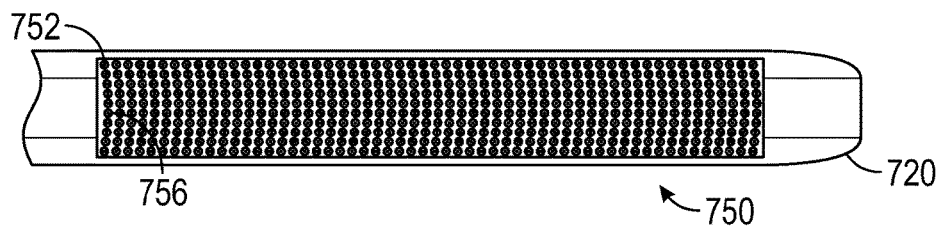
FIG. 15 illustrates a schematic view of another embodiment of a traction assembly.
Figure 16:
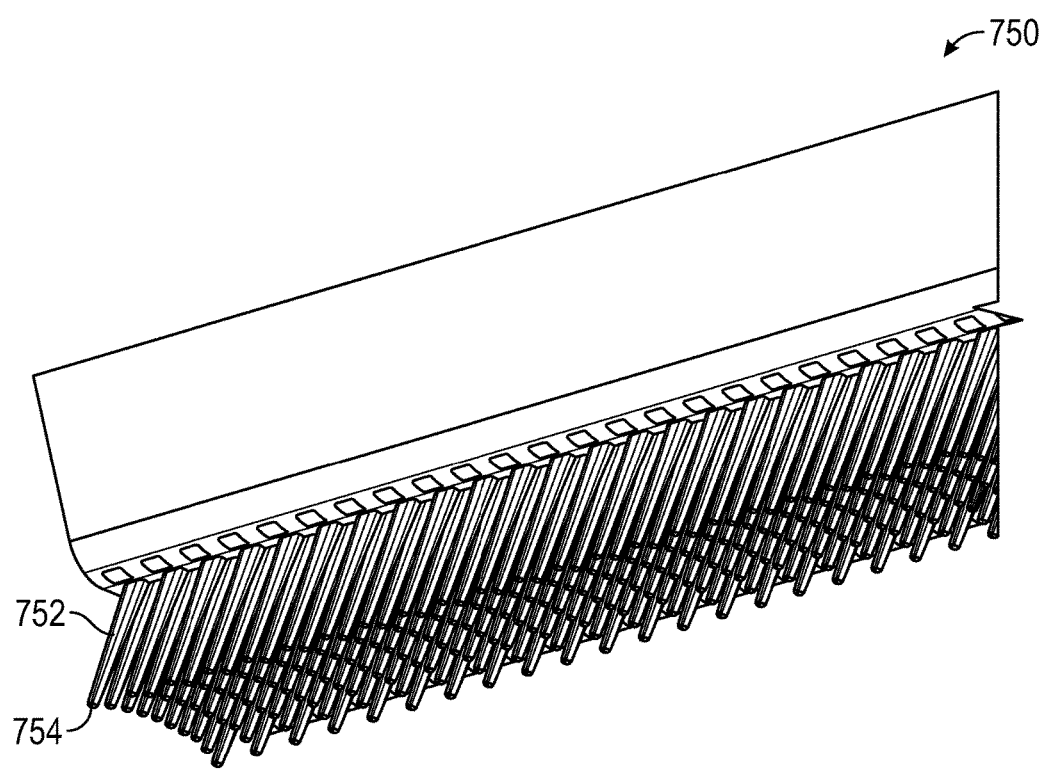
FIG. 16 illustrates a perspective view of the traction assembly of FIG. 15.

FIG. 10 illustrates an embodiment of the right earstem 420 of eyewear 400 positioned between a lateral side of the user's head (not shown) and the user's ear 490. The right earstem 420 can include a traction surface (not shown) forming at least part of an exterior surface of the right earstem 420. The traction surface can be configured to contact the lateral side of the user's head and/or the user's ear 490. For example, the traction surface can contact a user's ear 490 along a contact surface 492, the contact surface 492 including multiple points of contact between the user's nose and the traction surface. As shown in the illustrated embodiment, at a contact point 494 with the contact surface 492, a three-dimensional coordinate system is illustrated. With respect to this three-dimensional coordinate system, the y-axis is normal to the contact surface 492 at the contact point 494, the x-axis is orthogonal to the y-axis and parallel to a horizontal plane at the contact point 494, and the z-axis is orthogonal to both the x-axis and the y-axis at the contact point 494. As shown in the illustrated embodiment, the y-axis extends in a direction away from the user's ear 490, the x-axis extends in a direction generally anteriorly relative to the user's ear 490, and the z-axis extending in a direction generally upwardly relative to the user's ear 490.

In some embodiments, the traction surface can be configured such that it exerts a force on the contact surface 492 to counteract an applied force upon the eyewear 400. For example, as shown in the illustrated embodiment, the traction surface can be configured to exert a traction force 496a to counteract an applied force 495a upon the eyewear 400. This can beneficially retain the eyewear 400 in place relative to the user's ear 490. The force 495a can be caused, for example, due to movement of the user relative to the eyewear 400. In some instances, the amount of traction force the traction surface can apply upon the contact surface 492 before the traction surface slips relative to the contact surface 492 can vary depending on the directionality of the applied force. For example, as shown in the illustrated embodiment, the traction surface can exert a greater amount of traction force 496a before slipping when the applied force 495a is in a direction generally anteriorly relative to the user's ear 490 whereas the traction surface can exert a lesser amount of traction force 496b before slipping when the applied force 495*b* is in a direction generally upwardly relative to the user's ear 490 and/or posteriorly relative to the user's ear 490. This can be particularly beneficial as an eyewear 400 may most likely slip from a user's ear in a direction generally anteriorly relative to the user's ear 490. A greater amount of traction force before slipping can enhance retention of the eyewear 400 on the user's head. Moreover, a user may remove the eyewear 400 from the user's head in a direction generally upwardly relative to the user's ear 490 and/or wear the eyewear 400 by sliding the eyewear posteriorly relative to the user's head. A lesser amount of force would therefore be required to wear and remove the eyewear 400 from the user's head.

As shown in the illustrated embodiment, the traction surface can exert a relatively greater or maximum amount of traction force before slipping when the applied force is in a direction generally anteriorly relative to the user's ear 490. In some embodiments, the traction surface can exert a relatively greater or maximum amount of traction force before slipping when the applied force forms an acute angle with the z-axis and/or forms an acute angle with the x-axis. In some embodiments, the traction surface can exert a relatively greater or maximum amount of traction force before slipping when the applied force forms an obtuse angle with the z-axis and/or forms an acute angle with the x-axis.

As shown in the illustrated embodiment, the traction surface can exert a relatively lower or minimum amount of traction force before slipping when the applied force is in a direction generally upwardly relative to the user's ear 490 and/or posteriorly relative to the user's ear 490. In some embodiments, the traction surface can exert a relatively lower or minimum amount of traction force before slipping when the applied force forms an obtuse angle with the x-axis and/or forms an acute angle with the z-axis. In some embodiments, the traction surface can exert a relatively lower or minimum amount of traction force before slipping when the applied force forms an obtuse angle with the x-axis and/or forms an obtuse angle with the z-axis.

FIGS. 11-16 illustrate views of embodiments of traction assemblies 550, 650, 750 which can be formed along inner portions of the earstems, such as right earstems 520, 620, 720. The traction assemblies can include extensions, such as horizontal extensions 552 which extend horizontally along a length of the right earstem 520, vertical extensions 652 which extend vertically along the right earstem 620, and rod extensions 752 which have a rod-like shape, which extend from a surface of the earstem. These extensions can include tips 554, 654, 754 which can include traction surfaces such as those described herein. In some embodiments, the use of extensions can be beneficial in reducing the likelihood that the traction surfaces contact a user's hair. For example, the extensions, such as extensions 552, 652, 752, can be sized and shaped such that they extend past a user's hair and allow tips, such as tips 554, 654, 754, to contact a user's scalp. For example, in some embodiments, the extensions can include a curvature such as that illustrated in connection with extensions 652 wherein a middle portion 656 of the extensions 652 extend further in a posterior direction than the ends 658*a*, 658*b* of the extensions. Such curvature is also illustrated in connection with extensions 752 in which the extensions are offset 752 such that extensions 752 along a middle portion, such as extension 756, are positioned further posteriorly than extensions 752 along the ends. As another example, in some embodiments, the extensions can project outwardly at an angle such as that illustrated in connection with extensions 652,752.

In some embodiments, to reduce the likelihood that the traction surfaces contact a user's hair, the portions of the eyewear positioned adjacent or proximate a user's hair, such as an earstem, can have traction surfaces along portions of the earstem which are less likely to contact a user's hair but would still contact a user's ear. For example, the traction surfaces can be positioned along a bottom and/or outwardly facing portion of the earstem.

Other Embodiments

While certain embodiments have been described, these embodiments have been presented by way of example only, and are not intended to limit the scope of the disclosure. Indeed, the novel devices, system and methods described herein may be embodied in a variety of other forms. Furthermore, various omissions, substitutions and changes in the systems and methods described herein may be made. The accompanying claims and their equivalents are intended to cover such forms or modifications as would fall within the scope of the disclosure. Accordingly, the scope of the present disclosure is defined only by reference to the claims presented herein or as presented in the future.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that such features, elements and/or steps are in any way required for one or more embodiments.

Moreover, the following terminology may have been used herein. The singular forms "a," "an," and "the" include plural referents unless the context clearly dictates otherwise. Thus, for example, reference to an item includes reference to one or more of such items. The term "ones" refers to one, two, or more, and generally applies to the selection of some or all of a quantity. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The term "about," "approximately," or "generally," means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. For example, in some embodiments, the terms "about", "approximately", or "generally", may be within 20% of the stated value. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, in some embodiments, the terms "substantially" may be within 5% of the stated value.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items.

The following is claimed:

1. An eyewear comprising:
   a support configured to be carried on a head of a user and configured to support a lens in a field of view of the user, the support comprising:
   an earstem comprising an exterior surface configured to be positioned proximate a lateral side of the user's head and a user's ear during use; and
   a nosepiece comprising an exterior surface configured to be positioned proximate a user's nose during use; and
   a traction surface on at least one of the earstem and the nosepiece, the traction surface being configured to exert a traction force on a contact surface at a plurality of contact points within the contact surface, the traction force being configured to inhibit slipping of the eyewear on the user's head when worn, wherein at a contact point within the contact surface, the traction surface is configured such that:
   when subject to a force in a first direction within a plane tangent to the contact surface at the contact point, the traction surface can exert up to a first amount of traction force before slipping, and
   when subject to a force in a second direction within the plane tangent to the contact surface at the contact point, the traction surface can exert up to a second amount of traction force before slipping,
   wherein the first amount of traction force is greater than the second amount of traction force, and
   wherein the traction surface comprises a plurality of micro-scale or nano-scale protrusions extending from the exterior surface on which the traction surface is located.

2. The eyewear of claim 1, wherein:
   the traction surface is on at least the nosepiece and the contact surface is at least a portion of the user's nose; and
   at one or more contact points within the contact surface, the first direction extends generally downwardly and anteriorly relative to the user's nose and forms an acute angle with a first axis, the first axis being within the plane tangent to the contact surface at the one or more contact points and parallel to a horizontal axis.

3. The eyewear of claim 1, wherein:
   the traction surface is on at least the earstem and the contact surface is at least a portion of the user's ear; and
   at one or more contact points within the contact surface, the first direction extends generally anteriorly relative to the user's ear.

4. The eyewear of claim 3, wherein the plurality of protrusions extend obliquely from the exterior surface on which the traction surface is located.

5. The eyewear of claim 1, wherein the traction surface is on both the earstem and the nosepiece.

6. The eyewear of claim 1, wherein the plurality of protrusions extends obliquely from the exterior surface on which the traction surface is located, wherein a vector defines the extension of the plurality of protrusions and wherein at least a component of the vector is generally opposite the first direction.

7. The eyewear of claim 6, wherein the plurality of protrusions extending obliquely from the exterior surface is more parallel with the exterior surface than perpendicular.

8. The eyewear of claim 6, wherein the plurality of protrusions extending obliquely from the exterior surface is more perpendicular to the exterior surface than parallel.

9. The eyewear of claim 6, wherein the plurality of protrusions extending obliquely from the exterior surface is generally equally perpendicular to the exterior surface as parallel.

10. The eyewear of claim 1, wherein the traction surface is integrally formed on the support.

11. The eyewear of claim 1, wherein the traction surface is formed on a traction member, wherein the traction member is attached to the support.

12. An eyewear comprising:
    a support configured to be carried on a head of a user and configured to support a lens in a field of view of the user, the support comprising:
    an earstem comprising an exterior surface configured to be positioned proximate a lateral side of the user's head and a user's ear during use; and
    a nosepiece comprising an exterior surface configured to be positioned proximate a user's nose during use; and
    a traction surface on at least one of the earstem and the nosepiece, the traction surface being configured to exert a traction force on a contact surface at a plurality of contact points within the contact surface, the traction force being configured to inhibit slipping of the eyewear on the user's head when worn, wherein at a contact point within the contact surface, the traction surface is configured such that:
    when subject to a force in a first direction within a plane tangent to the contact surface at the contact point, the traction surface can exert up to a first amount of traction force before slipping, and when subject to a force in a second direction within the plane tangent to the contact surface at the contact point, the traction surface can exert up to a second amount of traction force before slipping, wherein the first amount of traction force is greater than the second amount of traction force, wherein the traction surface is integrally formed on the support, and wherein the traction surface is formed from a same material as a material of portions of the support adjacent the traction surface.

13. An eyewear comprising:

a support configured to be carried on a head of a user and configured to support a lens in a field of view of the user, the support comprising:

an earstem comprising an exterior surface configured to be positioned proximate a lateral side of the user's head and a user's ear;

a nosepiece comprising an exterior surface configured to be positioned proximate a user's nose; and a traction surface on at least one of the earstem and the nosepiece, the traction surface comprising a plurality of protrusions extending obliquely from the exterior surface on which the traction surface is located and configured to exert a traction force on a contact surface at a plurality of contact points within the contact surface, the traction surface being configured such that:

when subject to a force in a first direction within a plane tangent to the contact surface at one or more contact points within the plurality of contact points, the traction surface can exert up to a first amount of traction force before slipping, and when subject to a force in a second direction within the plane tangent to the contact surface at the one or more contact points, the traction surface can exert up to a second amount of traction force before slipping, wherein the first amount of traction force is greater than the second amount of traction force, wherein a vector defines the oblique extension of the plurality of protrusions from the exterior surface, and wherein at least a component of the vector is generally opposite the first direction.

14. The eyewear of claim 13, wherein the traction surface is on at least the nosepiece, the contact surface being at least a portion of the user's nose, the traction force being configured to inhibit slipping of the eyewear on the user's head when worn, wherein at a contact point within the contact surface:

the first direction extends generally downwardly and anteriorly relative to the user's nose and forms an acute angle with a first axis, the first axis being within the plane tangent to the contact surface at the one or more contact points and parallel to a horizontal axis.

15. The eyewear of claim 14, wherein the one or more contact points comprise a majority of contact points within the contact surface.

16. The eyewear of claim 13, wherein the traction surface comprises a first portion and a second portion, wherein:

at a first contact point within a first portion of the contact surface, the first portion of the traction surface is configured such that:

when subject to the force in the first direction within a plane tangent to the first portion of the contact surface at the first contact point, the traction surface can exert up to the first amount of traction force before slipping, and when subject to the force in the second direction within a plane tangent to the first portion of the contact surface at the first contact point, the traction surface can exert up to the second amount of traction force before slipping, wherein the first amount of traction force is greater than the second amount of traction force; and at a second contact point within a second portion of the contact surface, the second portion of the traction surface is configured such that:

when subject to a force in a third direction within a plane tangent to the second portion of the contact surface at the second contact point, the traction surface can exert up to a third amount of traction force before slipping, and when subject to a force in a fourth direction within a plane tangent to the second portion of the contact surface at the second contact point, the traction surface can exert up to a fourth amount of traction force before slipping, wherein the third amount of traction force is greater than the fourth amount of traction force; and wherein the first direction is different from the third direction.

17. The eyewear of claim 13, wherein the traction surface is integrally formed on the support and wherein the traction surface is formed from a same material as a material of portions of the support adjacent the traction surface.

18. The eyewear of claim 13, wherein the traction surface is formed on a traction member, wherein the traction member is removably attached to the support.

19. The eyewear of claim 13, wherein the protrusions are nano-scale protrusions.

20. The eyewear of claim 13, wherein the protrusions are micro-scale protrusions.

* * * * *